(12) United States Patent
Suzuki et al.

(10) Patent No.: US 11,929,463 B2
(45) Date of Patent: *Mar. 12, 2024

(54) ALL-SOLID-STATE SECONDARY BATTERY AND METHOD OF CHARGING THE SAME

(71) Applicant: Samsung Electronics Co., Ltd., Suwon-si (KR)

(72) Inventors: Naoki Suzuki, Yokohama (JP); Nobuyoshi Yashiro, Yokohama (JP); Takanobu Yamada, Yokohama (JP); Yuichi Aihara, Yokohama (JP)

(73) Assignee: SAMSUNG ELECTRONICS CO., LTD., Gyenonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/163,963

(22) Filed: Feb. 3, 2023

(65) Prior Publication Data
US 2023/0187705 A1 Jun. 15, 2023

Related U.S. Application Data

(63) Continuation of application No. 17/208,142, filed on Mar. 22, 2021, now Pat. No. 11,764,407, which is a continuation of application No. 16/196,252, filed on Nov. 20, 2018, now Pat. No. 10,985,407.

(30) Foreign Application Priority Data

Nov. 21, 2017 (JP) ................. 2017-223661

(51) Int. Cl.
| | |
|---|---|
| *H01M 10/44* | (2006.01) |
| *H01M 4/133* | (2010.01) |
| *H01M 4/36* | (2006.01) |
| *H01M 4/38* | (2006.01) |
| *H01M 4/587* | (2010.01) |
| *H01M 4/66* | (2006.01) |
| *H01M 10/0525* | (2010.01) |
| *H01M 10/0562* | (2010.01) |
| *H01M 10/0585* | (2010.01) |
| *H01M 4/02* | (2006.01) |
| *H01M 10/42* | (2006.01) |

(52) U.S. Cl.
CPC ....... *H01M 10/0585* (2013.01); *H01M 4/133* (2013.01); *H01M 4/364* (2013.01); *H01M 4/366* (2013.01); *H01M 4/382* (2013.01); *H01M 4/587* (2013.01); *H01M 4/667* (2013.01); *H01M 10/0525* (2013.01); *H01M 10/0562* (2013.01); *H01M 10/44* (2013.01); *H01M 2004/021* (2013.01); *H01M 2004/027* (2013.01); *H01M 2010/4292* (2013.01)

(58) Field of Classification Search
CPC ...... H02J 7/0042; H01M 4/366; H01M 4/667; H01M 4/13; H01M 4/133; H01M 4/382; H01M 4/587; H01M 2004/027; H01M 2004/021; H01M 4/364; H01M 10/0585; H01M 10/0525; H01M 10/0562; H01M 10/052; H01M 10/44; H01M 10/46; H01M 2010/4292

USPC .............. 320/107, 114, 137; 429/217, 218.1, 429/231.9, 231.95, 232

See application file for complete search history.

(56) References Cited

U.S. PATENT DOCUMENTS

| | | |
|---|---|---|
| 5,114,810 A | 5/1992 | Frysz et al. |
| 6,030,726 A | 2/2000 | Takeuchi et al. |
| 6,303,017 B1 | 10/2001 | Page et al. |
| 6,402,795 B1 | 6/2002 | Chu et al. |
| 6,884,546 B1 | 4/2005 | Fujita et al. |
| 7,150,941 B2 | 12/2006 | Fujita et al. |
| 7,556,881 B2 | 7/2009 | Yanagida et al. |
| 7,601,318 B2 | 10/2009 | Armand et al. |
| 8,088,514 B2 | 1/2012 | Takami et al. |
| 8,137,845 B2 | 3/2012 | Kim et al. |
| 8,507,135 B2 | 8/2013 | Grupp et al. |
| 8,628,883 B2 | 1/2014 | Ishida et al. |
| 8,922,171 B2 | 12/2014 | Shimizu et al. |
| 9,166,222 B2 | 10/2015 | Amiruddin et al. |
| 9,466,837 B1 | 10/2016 | Yoon et al. |
| 9,806,373 B2 | 10/2017 | Kambara et al. |
| 9,887,415 B2 | 2/2018 | Fischer et al. |
| 9,923,195 B2 | 3/2018 | Amiruddin et al. |
| 10,985,407 B2 * | 4/2021 | Suzuki ................. H01M 4/382 |

(Continued)

FOREIGN PATENT DOCUMENTS

| | | |
|---|---|---|
| CN | 102362384 A | 2/2012 |
| CN | 103190026 A | 7/2013 |

(Continued)

OTHER PUBLICATIONS

"Safety Requirements For Portable Sealed Secondary Cells, And For Batteries Made From Them, For Use In Portable Applications", Japanese Standards Association, JISC8712:2015.

(Continued)

*Primary Examiner* — Edward Tso
(74) *Attorney, Agent, or Firm* — CANTOR COLBURN LLP

(57) ABSTRACT

An all-solid-state secondary battery including: a cathode including a cathode active material layer; an anode including an anode current collector, and an anode active material layer on the anode current collector, wherein the anode active material layer includes an anode active material which is alloyable with lithium or forms a compound with lithium; and a solid electrolyte layer between the cathode and the anode, wherein a ratio of an initial charge capacity (b) of the anode active material layer to an initial charge capacity (a) of the cathode active material layer satisfies a condition of Equation 1: $0.01<(b/a)<0.5$, wherein a is the initial charge capacity of the cathode active material layer determined from a first open circuit voltage to a maximum charging voltage, and b is the initial charge capacity of the anode active material layer determined from a second open circuit voltage to 0.01 volts vs. $Li/Li^+$.

20 Claims, 11 Drawing Sheets

(56) References Cited

U.S. PATENT DOCUMENTS

| | | |
|---|---|---|
| 2003/0003364 A1 | 1/2003 | Mori et al. |
| 2003/0129497 A1 | 7/2003 | Yamamoto et al. |
| 2005/0164087 A1 | 7/2005 | Fujita et al. |
| 2006/0141359 A1 | 6/2006 | Yanagida et al. |
| 2007/0218333 A1 | 9/2007 | Iwamoto |
| 2010/0151331 A1 | 6/2010 | Sun et al. |
| 2011/0104568 A1 | 5/2011 | Sung et al. |
| 2011/0171502 A1 | 7/2011 | Kottenstette et al. |
| 2012/0009452 A1 | 1/2012 | Ueda |
| 2013/0084499 A1 | 4/2013 | Yanagita et al. |
| 2013/0298386 A1 | 11/2013 | Tarascon et al. |
| 2014/0027291 A1 | 1/2014 | Vidal et al. |
| 2014/0072866 A1 | 3/2014 | Kitada et al. |
| 2014/0093783 A1 | 4/2014 | Lamanna et al. |
| 2014/0093786 A1 | 4/2014 | Ito et al. |
| 2014/0127557 A1 | 5/2014 | Kasahara et al. |
| 2014/0329118 A1 | 11/2014 | Nagase et al. |
| 2015/0147660 A1 | 5/2015 | Fujiki et al. |
| 2015/0162604 A1 | 6/2015 | Park et al. |
| 2015/0171431 A1 | 6/2015 | Yamada et al. |
| 2016/0013462 A1 | 1/2016 | Cui et al. |
| 2016/0043392 A1 | 2/2016 | Fujiki et al. |
| 2016/0149259 A1 | 5/2016 | Osada et al. |
| 2016/0172660 A1 | 6/2016 | Fischer et al. |
| 2016/0172661 A1 | 6/2016 | Fischer et al. |
| 2016/0233553 A1 | 8/2016 | Yamasaki et al. |
| 2016/0329603 A1 | 11/2016 | Labyedh et al. |
| 2016/0372784 A1 | 12/2016 | Hayner et al. |
| 2016/0372798 A1 | 12/2016 | Ishii |
| 2017/0155127 A1 | 6/2017 | Shindo |
| 2017/0162901 A1 | 6/2017 | Chen et al. |
| 2017/0170467 A1 | 6/2017 | Miki |
| 2017/0187066 A1 | 6/2017 | Tsujimura et al. |
| 2017/0222272 A1 | 8/2017 | Takami et al. |
| 2017/0237116 A1 | 8/2017 | Sankyo |
| 2017/0309914 A1 | 10/2017 | Drews et al. |
| 2018/0102531 A1 | 4/2018 | Fischer et al. |
| 2018/0102532 A1 | 4/2018 | Fischer et al. |
| 2018/0198118 A1 | 7/2018 | Amiruddin et al. |
| 2019/0004449 A1 | 1/2019 | Nojiri |
| 2019/0051933 A1 | 2/2019 | Li et al. |
| 2019/0157723 A1 | 5/2019 | Suzuki et al. |
| 2019/0207209 A1 | 7/2019 | Venkatachalam et al. |
| 2019/0214677 A1 | 7/2019 | Yamada et al. |
| 2022/0384778 A1 | 12/2022 | Amiruddin et al. |

FOREIGN PATENT DOCUMENTS

| | | |
|---|---|---|
| CN | 103560267 A | 2/2014 |
| CN | 107112481 A | 8/2017 |
| EP | 1923935 A1 | 5/2008 |
| JP | 1996511581 A | 12/1996 |
| JP | 11310405 A | 11/1999 |
| JP | 2001313024 A | 11/2001 |
| JP | 2002237293 A | 8/2002 |
| JP | 2002280073 A | 9/2002 |
| JP | 2002373707 A | 12/2002 |
| JP | 2003123740 A | 4/2003 |
| JP | 2004509058 A | 3/2004 |
| JP | 2004185975 A | 7/2004 |
| JP | 2004213946 A | 7/2004 |
| JP | 2005285647 A | 10/2005 |
| JP | 2005353309 A | 12/2005 |
| JP | 200612761 A | 1/2006 |
| JP | 2006107812 A | 4/2006 |
| JP | 2006269345 A | 10/2006 |
| JP | 3989945 B2 | 10/2007 |
| JP | 2008103284 A | 5/2008 |
| JP | 2008300148 A | 12/2008 |
| JP | 201073544 A | 4/2010 |
| JP | 2010219047 A | 9/2010 |
| JP | 201186554 A | 4/2011 |
| JP | 2011086554 A | 4/2011 |
| JP | 2011090876 A | 5/2011 |
| JP | 2011165343 A | 8/2011 |
| JP | 201249001 A | 3/2012 |
| JP | 2012138372 A | 7/2012 |
| JP | 201365453 A | 4/2013 |
| JP | 2013080616 A | 5/2013 |
| JP | 2013089423 A | 5/2013 |
| JP | 2013516746 A | 5/2013 |
| JP | 2013125697 A | 6/2013 |
| JP | 2013529830 A | 7/2013 |
| JP | 5279756 B2 | 9/2013 |
| JP | 2013196933 A | 9/2013 |
| JP | 2013201110 A | 10/2013 |
| JP | 2014502006 A | 1/2014 |
| JP | 2014510385 A | 4/2014 |
| JP | 201496311 A | 5/2014 |
| JP | 2014096311 A | 5/2014 |
| JP | 2014116154 A | 6/2014 |
| JP | 201511930 A | 1/2015 |
| JP | 201565029 A | 4/2015 |
| JP | 2015103451 A | 6/2015 |
| JP | 2015115319 A | 6/2015 |
| JP | 2015118772 A | 6/2015 |
| JP | 201639006 A | 3/2016 |
| JP | 2016041219 A | 3/2016 |
| JP | 2016100088 A | 5/2016 |
| JP | 2016213105 A | 12/2016 |
| JP | 2017022120 A | 1/2017 |
| JP | 2017084515 A | 5/2017 |
| JP | 2017103065 A | 6/2017 |
| JP | 2017111930 A | 6/2017 |
| JP | 2017112044 A | 6/2017 |
| JP | 2017117753 A | 6/2017 |
| JP | 2018025594 A | 2/2018 |
| JP | 201892955 A | 6/2018 |
| JP | 2019012200 A | 1/2019 |
| JP | 2019033053 A | 2/2019 |
| JP | 2019036537 A | 3/2019 |
| JP | 2019046722 A | 3/2019 |
| JP | 2019096610 A | 6/2019 |
| KR | 1020060076716 A | 7/2006 |
| KR | 20100131368 A | 12/2010 |
| KR | 1020140022253 A | 2/2014 |
| KR | 1020140036660 A | 3/2014 |
| KR | 1020140074174 A | 6/2014 |
| WO | 0122519 A1 | 3/2001 |
| WO | 2012060349 A1 | 5/2012 |
| WO | 2012061191 A2 | 5/2012 |
| WO | 2012098551 A1 | 7/2012 |
| WO | 2013084302 A1 | 6/2013 |
| WO | 2016094750 A1 | 6/2016 |

OTHER PUBLICATIONS

Guangyuan Zheng et al., Interconnected hollow carbon nanospheres for stable lithium metal anodes, Nature Nanotechnology, DOI: 10.1038/nnano.2014.152, Jul. 27, 2014, pp. 618-623, vol. 9, 2014 Macmillan Publishers Limited.

Suzuki, N., et al., "Synthesis and Electrochemical Properties of I4$^-$-Type Li1+2xZn1—xPS4 Solid Electrolyte," Chemistry of Materials, Mar. 9, 2018, vol. 30, pp. 2236-2244.

Turnbaugh PL et al., An obesity-associated gut microbiome with increased capacity for energy harvest, Published: Dec. 21, 2006, pp. 1027-1031, vol. 444, 2006 Nature PublishingGroup.

Kai Yan et al., "Selective deposition and stable encapsulation of lithium through heterogeneous seeded growth," Nature Energy, Feb. 22, 2016, pp. 1-8, vol. 1, Article No. 16010, DOI: 10.1038/NENERGY. 2016.10.

Takashi Hakari et al., "All-solid-state lithium batteries with Li3PS4 glass as active material", Journal of Power Sources, Jun. 9, 2015, pp. 721-725, vol. 293.

Japanese Office Action for Japanese Patent Application for 2019-095156 dated Mar. 14, 2023.

Japanese Office Action for Japanese Patent Application No. 2019-095156 dated Mar. 14, 2023.

JP Office Action dated Aug. 29, 2023 of JP Patent Application No. 2020-013978.

New-Generation Lithium Secondary Battery Technology.

(56) References Cited

OTHER PUBLICATIONS

CN Patent Applications No. 201880086315.9 dated Nov. 30, 2023.
Notice of Third Party Observation for Korean Patent Application No. 10-2019-0097640 dated Nov. 28, 2023.

* cited by examiner

ALL-SOLID-STATE SECONDARY BATTERY AND METHOD OF CHARGING THE SAME

CROSS-REFERENCE TO RELATED APPLICATION

This application is continuation of U.S. patent application Ser. No. 17/208,142, filed on Mar. 22, 2021, which is a continuation of U.S. patent application Ser. No. 16/196,252, filed on Nov. 20, 2018, and issued as U.S. Pat. No. 10,985,407, which claims priority to and the benefit of Japanese Patent Application No. 2017-223661, filed on Nov. 21, 2017, in the Japanese Patent Office, and all the benefits accruing therefrom under 35 U.S.C. § 119, the contents of each of which is incorporated herein in its entirety by reference.

BACKGROUND

1. Field

The present disclosure relates to an all-solid-state secondary battery, methods of manufacture thereof, and methods of charging the same.

2. Description of the Related Art

Recently, all-solid-state secondary batteries using a solid electrolyte as an electrolyte have attracted attention. To increase energy density of an all-solid-state secondary battery, use of lithium as an anode active material has been proposed. The theoretical specific capacity (i.e., the capacity per unit mass) of lithium is 3,861 milliampere-hours per gram (mAh/g), which is about 10 times greater than that of graphite, which has a theoretical specific capacity of 372 mAh/g. Also, lithium provides a capacity density of 2062 milliampere-hours per cubic centimeter ($mAh/cm^3$), which is about three times greater than the capacity density of graphite, which provides 756 $mAh/cm^3$. Thus, when lithium is used as an anode active material, an all-solid-state secondary battery may be lighter and smaller than a lithium ion battery having a graphite anode active material. Also, a lithium battery having greater rate capability may be realized.

However, when lithium is used as an anode active material in an all-solid-state battery a lithium dendrite may form, which may cause reduced in capacity, or a short circuit. There accordingly remains a need for an improved anode active material and methods providing the improved anode active material.

SUMMARY

An aspect of the present disclosure is made to address the above-described problems, and provides an all-solid-state secondary battery that uses lithium as an anode active material and may have enhanced characteristics, and a method of charging the same.

Additional aspects will be set forth in part in the description which follows and, in part, will be apparent from the description, or may be learned by practice of the presented embodiments.

According to an embodiment, an all-solid-state secondary battery includes: a cathode including a cathode active material layer; an anode including an anode current collector, and an anode active material layer on the anode current collector, wherein the anode active material layer includes an anode active material which is alloyable with lithium or forms a compound with lithium; and a solid electrolyte layer between the cathode and the anode, wherein a ratio of an initial charge capacity of the anode active material layer to an initial charge capacity of the cathode active material layer satisfies the condition of Equation 1:

$$0.01<(b/a)<0.5 \qquad \text{Equation 1}$$

wherein a is the initial charge capacity of the cathode active material layer determined from a first open circuit voltage to a maximum charging voltage vs. $Li/Li^+$, and wherein b is the initial charge capacity of the anode active material layer determined from a second open circuit voltage to 0.01 Volts (V) vs. $Li/Li^+$.

In this regard, the initial charge capacity of the cathode active material layer is greater than that of the anode active material layer. In addition, the anode active material layer may include a material alloyable with lithium or forming a compound with lithium. When the all-solid-state secondary battery having such a configuration is charged, lithium may be incorporated into the anode active material layer at the initial stage of charging. After the initial charge capacity of the anode active material layer is exceeded, lithium is deposited on a rear surface of the anode active material layer. A metal layer may be formed by the deposited lithium. During discharge, lithium of the anode active material layer and the metal layer may be ionized and transferred towards the cathode. Because lithium may be used as an anode active material, energy density may be enhanced. In addition, the anode active material layer may cover the metal layer, and thus may act as a protective layer for the metal layer, and also the anode active material layer may inhibit the deposition and growth of a dendrite. This may inhibit or reduce the likelihood of a short circuit and capacity reduction of the all-solid-state secondary battery, and furthermore, may enhance characteristics of the all-solid-state secondary battery.

The anode active material layer may include the anode active material and a binder.

In this regard, the anode active material layer may be stabilized on the anode current collector. For example, when the anode active material layer does not include a binder, the anode active material layer may detach from the anode current collector. A portion of the anode current collector, from which the anode active material layer may be detached, is exposed, and thus a short circuit may occur. The anode active material layer may be formed by, for example, coating a slurry, in which materials constituting the anode active material layer are dispersed, onto an anode current collector and drying the coated anode current collector. The binder may be included in the anode active material layer to stably disperse the anode active material in the slurry. As a result, when the slurry is coated onto the anode current collector by, for example, screen printing, clogging of a screen (e.g., clogging of a screen due to an aggregate of the anode active material) may be minimized or suppressed.

An amount of the binder may range about 0.3 weight percent (wt %) to about 15 wt %, with respect to a total weight of the anode active material layer.

In this case, the all-solid-state secondary battery has further enhanced characteristics.

The anode active material layer may have a thickness of about 1 micrometer (μm) to about 20 μm.

The anode active material may be in the form of a particle, and an average particle diameter D50 of the anode active material may be about 4 μm or less.

The anode active material may include at least one of amorphous carbon, gold (Au), platinum (Pt), palladium (Pd), silicon (Si), silver (Ag), aluminum (Al), bismuth (Bi), tin (Sn), or zinc (Zn).

The anode active material may include amorphous carbon.

The anode active material may include a mixture of the amorphous carbon and at least one of Au, Pt, Pd, Si, Ag, Al, Bi, Sn, or Zn.

The anode active material may include a mixture of a first particle comprising amorphous carbon and a second particle comprising a metal, a semiconductor, or a combination thereof, wherein an amount of the second particle may range from about 8 wt % to about 60 wt %, with respect to a total weight of the mixture.

The all-solid-state secondary battery may further include a thin film disposed on the anode current collector, the thin film including an element alloyable with lithium. The thin film may be arranged between the anode current collector and the anode active material layer.

The thin film may have a thickness of about 1 nanometer (nm) to about 500 nm.

The all-solid-state secondary battery may further include a metal layer disposed between the anode current collector and the anode active material layer, wherein the metal layer may include lithium, a lithium alloy, or a combination thereof.

The metal layer may be formed between the anode current collector and the anode active material layer before the all-solid-state secondary battery is charged.

In an embodiment wherein the metal layer is formed between the anode current collector and the anode active material layer before the all-solid-state secondary battery is charged, the metal layer may be prepared before the first charge cycle. Since the metal layer acts as a lithium reservoir, the all-solid-state secondary battery has further enhanced characteristics.

The metal layer may have a thickness of about 1 μm to about 200 μm.

The anode current collector, the anode active material layer, and a region therebetween may be Li-free regions at an initial state of or after discharge of the all-solid-state secondary battery.

The all-solid-state secondary battery may be a lithium battery.

According to another embodiment, an all-solid-state secondary battery may include a cathode; an anode; and a solid electrolyte layer, wherein the cathode includes a cathode active material layer, wherein the anode includes an anode current collector and an anode active material layer on a surface of the anode current collector, wherein the anode active material layer comprises a binder and an anode active material comprising amorphous carbon, wherein the solid electrolyte layer is between the cathode active material layer and the anode active material layer, and wherein a ratio of an initial charge capacity of the anode active material layer to initial charge capacity of the cathode active material layer satisfies the condition of Equation 1:

$$0.01<(b/a)<0.5 \qquad \text{Equation 1}$$

wherein a is the initial charge capacity of the cathode active material layer, determined from a first open circuit voltage to a maximum charging voltage vs. Li/Li$^+$, and wherein b is the initial charge capacity of the anode active material layer, determined from a second open circuit voltage to 0.01 V vs. Li/Li$^+$.

The amorphous carbon may include furnace black, acetylene black, Ketjen black, thermal black, channel black, lampblack, graphene, or a combination thereof.

The amorphous carbon may be in a form of a particle and may include an average particle diameter D50 of about 4 micrometers or less.

The anode active material may further include a second particle.

A ratio of the amorphous carbon to the second particles may be about 20:1 to about 1:2, or about 10:1 to about 1:1.

The second particle may include silicon, silver, tin, zinc, platinum, or a combination thereof.

The second particle may include silver, tin, zinc, or a combination thereof.

The binder may include styrene butadiene rubber, polytetrafluoroethylene, polyvinylidene fluoride, polyethylene, or a combination thereof.

The all-solid-state secondary battery may further include a thin film disposed on the anode current collector and between the anode current collector and the anode active material layer, the thin film including a lithium compound or an element alloyable with lithium.

The ratio of the initial charge capacity of the anode active material layer to the initial charge capacity of the cathode active material layer may satisfy a condition of Equation 1A:

$$0.01<(b/a)<0.3 \qquad \text{Equation 1A}$$

wherein a is the initial charge capacity of the cathode active material layer, determined from a first open circuit voltage to a maximum charging voltage vs. Li/Li$^+$, and wherein b is the initial charge capacity of the anode active material layer determined from a second open circuit voltage to 0.01 V vs. Li/Li$^+$.

The ratio of the initial charge capacity of the anode active material layer to the initial charge capacity of the cathode active material layer may satisfy Equation 1B:

$$0.01<(b/a)<0.2 \qquad \text{Equation 1B}$$

wherein a is the initial charge capacity of the cathode active material layer, determined from a first open circuit voltage to a maximum charging voltage vs. Li/Li$^+$, and wherein b is the initial charge capacity of the anode active material layer, determined from a second open circuit voltage to 0.01 V vs. Li/Li$^+$.

The ratio of the initial charge capacity of the anode active material layer to the initial charge capacity of the cathode active material layer may satisfy a condition of Equation 1C:

$$0.01<(b/a)<0.1 \qquad \text{Equation 1C}$$

wherein a is the initial charge capacity of the cathode active material layer, determined from a first open circuit voltage to a maximum charging voltage vs. Li/Li$^+$, and wherein b is the initial charge capacity of the anode active material layer, determined from a second open circuit voltage to 0.01 V vs. Li/Li$^+$.

According to still another embodiment, a method of charging the all-solid-state secondary battery includes charging the all-solid-state secondary battery, wherein the initial charge capacity of the anode active material layer is exceeded.

A charge capacity of the all-solid-state secondary battery may be about two times to about 100 times greater than the charge capacity of the anode active material layer.

At an initial charge, lithium may be incorporated into the anode active material layer. After the initial charge capacity of the anode active material layer is exceeded, lithium may be deposited on a rear surface of the anode active material layer between the anode active material layer and the anode current collector to form a lithium metal layer on the current collector. During discharge, the lithium of the anode active material layer and the lithium metal layer may be ionized and transferred to the cathode. Thus, the lithium metal layer may be used as an anode active material. In addition, since the anode active material layer covers the lithium metal layer, the anode active material layer may act as a protective layer for the metal layer and may suppress the deposition and growth of a dendrite, thereby inhibiting a short circuit and avoiding capacity reduction of the all-solid-state secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
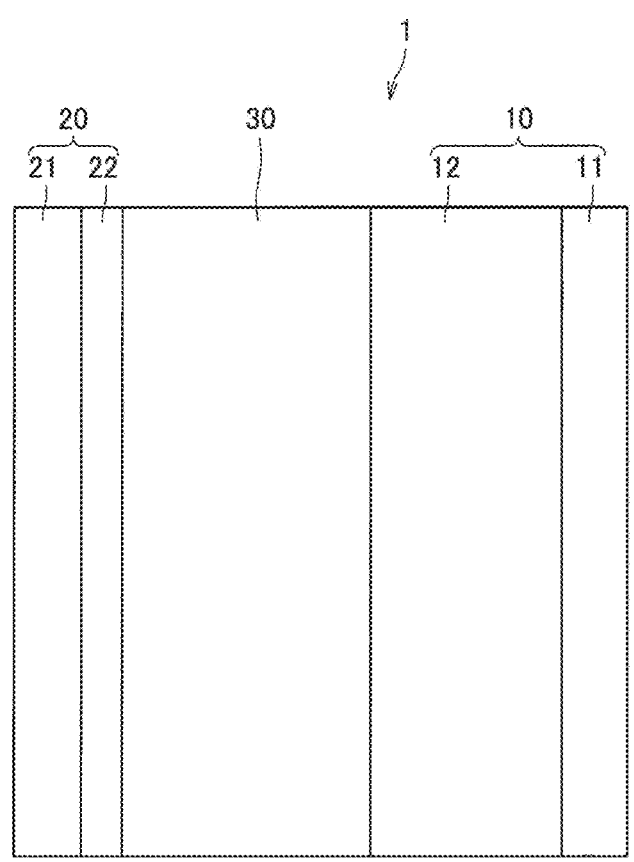
FIG. 1 is a schematic cross-sectional view illustrating a first embodiment of a structure of an all-solid-state secondary battery.

Various example embodiments will now be described more fully with reference to the accompanying drawings in which example embodiments are shown.

It will be understood that when an element is referred to as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present. As used herein the term "and/or" includes any and all combinations of one or more of the associated listed items. "Or" means "and/or." Expressions such as "at least one of," when preceding a list of elements, modify the entire list of elements and do not modify the individual elements of the list.

It will be understood that, although the terms "first," "second" etc. may be used herein to describe various elements, components, regions, layers, and/or sections, these elements, components, regions, layers and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," "rear," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In the drawings, some of the elements may be omitted, but such omissions are not intended to exclude the omitted elements, but are intended to help understanding of the features of the present inventive concept.

The terminology used herein is for the purpose of describing particular embodiments and is not intended to be limiting of example embodiments. As used herein, the singular forms "a," "an," and "the" are intended to include the plural forms as well, unless the context clearly indicates otherwise. It will be further understood that the terms "includes" and/or "including," "haves" and/or "having," and "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, or +5% of the stated value.

All ranges disclosed herein are inclusive of the endpoints, unless clearly indicated otherwise, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," such as "10 wt % to 25 wt %" and "5 wt % to 15 wt %", etc.). Reference throughout the specification to "some embodiments", "an embodiment", "another embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined in the present specification.

Hereinafter, an all-solid-state secondary battery, methods of manufacture thereof, and methods of charging the same will be described in further detail with reference to the accompanying drawings. Widths and thicknesses of layers or regions illustrated in the accompanying drawings may be exaggerated for clarity and convenience of explanation. Throughout the detailed description, like reference numerals denote like elements.

Also provided is a method of using at least one of lithium or a lithium alloy as an anode active material.

Also disclosed is a method of using an anode active material, which does not comprise lithium, on an anode current collector, in which lithium is deposited between the anode current collector and the anode active material layer during charge, wherein the anode current collector comprises a metal that is not alloyable with lithium and does not form a compound with lithium.

Structure of All-Solid-State Secondary Battery

First, a structure of an all-solid-state secondary battery 100 according to a first embodiment will be described with reference to FIG. 1. As illustrated in FIG. 1, the all-solid-state secondary battery 100 may include a cathode 10, an anode 20, and a solid electrolyte layer 30 between the cathode and the anode.

Cathode

The cathode 110 comprises a cathode active material layer 112. The cathode 110 may optionally comprise a cathode current collector 111 on the cathode active material layer 112. The cathode current collector 111 may be a form of a plate or a foil and may comprise, for example, at least one of indium (In), copper (Cu), magnesium (Mg), stainless steel, titanium (Ti), iron (Fe), cobalt (Co), nickel (Ni), zinc (Zn), aluminum (Al), germanium (Ge), or lithium (Li), or an alloy thereof. In an embodiment in which the cathode current collector 111 is omitted, the cathode active material layer 112 may perform the function of current collection.

The cathode active material layer 112 may include a cathode active material and a solid electrolyte. In addition, the solid electrolyte included in the cathode 110 may be similar to or different from a solid electrolyte included in the solid electrolyte layer 130. In an embodiment, the cathode active material comprises a first solid electrolyte, and the solid electrolyte layer comprises a second solid electrolyte, wherein the first solid electrolyte and the second solid electrolyte may be independently selected. A detailed description of the solid electrolyte will be provided below in the description of the solid electrolyte layer 130.

In an embodiment, the solid electrolyte may be included in the cathode layer 112 in an amount of about 1 wt % to about 50 wt %, based on the total weight of the cathode layer 112.

The cathode active material may be any suitable cathode active material capable of reversibly intercalating, e.g., incorporating and deintercalating, e.g., deincorporating of lithium ions.

For example, the cathode active material may comprise at least one of a lithium metal oxide, a lithium metal phosphate, a sulfide, or an oxide. The lithium metal oxide may comprise a lithium transition metal oxide, and may comprise, for example, at least one of lithium cobalt oxide (hereinafter, referred to as "LCO"), lithium nickel oxide, lithium nickel cobalt oxide, lithium nickel cobalt aluminum oxide (hereinafter, referred to as "NCA"), lithium nickel cobalt manganese oxide (hereinafter, referred to as "NCM"), or lithium manganate. An example of a lithium phosphate is lithium iron phosphate. The sulfides may comprise at least one of nickel sulfide, copper sulfide, and lithium sulfide. The oxide may comprise at least one of iron oxide or vanadium oxide, or the like. The cathode active materials may be used alone, or a combination of cathode active materials may be used.

In an embodiment, the cathode active material may include a lithium transition metal oxide having a layered halite structure. As used herein, the term "layered halite structure" refers to a structure in which oxygen atomic layers and metal atomic layers are alternately arranged regularly in a <111> direction of a cubic halite structure, and as a result, each atomic layer forms a two-dimensional plane. The term "cubic halite structure" as used herein refers to a sodium chloride structure, which is a type of crystal structure, and, in particular, a structure in which face-centered cubic lattices formed by cations and anions, respectively, are dislocated with respect to each other by ½ of a unit cell dimension.

The lithium transition metal oxide having a layered halite structure may be, for example, at least one of a lithium transition metal oxide represented by the formula $LiNi_xCo_yAl_zO_2$ (NCA) wherein $0<x<1$, $0<y<1$, and $0<z<1$, wherein $x+y+z=1$, or the formula $LiNi_xCo_yMn_zO_2$ (NCM) wherein $0<x<1$, $0<y<1$, and $0<z<1$, wherein $x+y+z=1$. The stoichiometric coefficients x, y, and z may be independently selected for each lithium transition metal oxide.

When the cathode active material includes the lithium transition metal oxide having a layered halite structure, energy density and thermal stability of the all-solid-state secondary battery 100 may be enhanced.

The cathode active material may be covered by a coating. In this regard, the coating may comprise any suitable coating for a cathode active material of an all-solid-state secondary battery. The coating layer may include, for example, $LiNbO_3$, $Li_4TiO_5O_{12}$, $Li_2O—ZrO_2$, a lithium lanthanum zirconate such as $Li_{7-3x}Al_xLa_3Zr_2O_{12}$ wherein $0 \leq x \leq 1$, e.g., $Li_7La_3Zr_2O_{12}$, or the like. Additional details of the coating can be determined by one of skill in the art without undue experimentation, and thus are not further elaborated upon here for clarity.

In addition, the cathode active material comprises a lithium transition metal oxide such as NCA, NCM, or the like, and when Ni is included in the cathode active material, capacity of the all-solid-state secondary battery 100 may be increased, resulting in reduced metal deposition on the cathode active material when the battery is in a charged state. Accordingly, the all-solid-state secondary battery 100 according to the present embodiment may have enhanced long-term reliability in a charged state and improved cycle characteristics.

In an embodiment, the cathode active material may be in the form of a particle. The particle may have any suitable shape, may have a rectilinear or curvilinear shape, and may be spherical, oval, or a combination thereof. In addition, the particle diameter of the cathode active material is not particularly limited, and may have any suitable particle diameter for a cathode active material of an all-solid-state secondary batteries. The particle diameter may be about 500 nanometers (nm) to about 20 micrometers (μm), about 1 μm to about 15 μm, or about 5 μm to about 10 μm. Unless specified otherwise, particle diameter is a D50 particle diameter and determined by laser light scattering. The amount of the cathode active material of the cathode 110 is not particularly limited, and any suitable amount for a cathode of an all-solid-state secondary battery may be used. The content of the cathode active material in the cathode may be about 50 weight percent (wt %) to about 99 wt %, about 60 wt % to about 95 wt %, or about 70 wt % to about 90 wt %, based on a total weight of the cathode. Also, the cathode active material may be contained in the cathode active material layer 12 in an amount of about 55 wt % to about 99 wt %, about 65 wt % to about 97 wt %, or about 75 wt % to about 95 wt %, based on a total weight of the cathode active material layer 112.

In addition, the cathode 110 may comprise, for example, an appropriate amount of an additive, such as a conductive agent, a binder, a filler, a dispersant, or the like, in addition to the cathode active material and the solid electrolyte.

The conductive agent may be, for example, graphite, carbon black, acetylene black, Ketjen black, carbon fiber, metallic powder, or the like. A combination of conductive agents may be used. Also, the conductive agent may be included in any suitable amount, e.g., about 0.5 wt % to about 10 wt %, based on a total weight of the cathode. The conductive agent may be included in an amount of about 0.5 wt % to about 10 wt %, based on a total weight of the cathode active material layer 112.

If desired, the cathode 110 may comprise a binder. The binder may comprise, for example, styrene butadiene-rubber (SBR), polytetrafluoroethylene, polyvinylidene fluoride, polyethylene, or the like. A combination of binders may be used. Also, the binder may be included in any suitable amount, e.g., about 0.1 wt % to about 10 wt %, based on a total weight of the cathode. The binder may be included in an amount of about 0.1 wt % to about 10 wt %, based on a total weight of the cathode active material layer 112.

Anode

The anode 120 may include an anode current collector 121 and an anode active material on the current collector. In an embodiment, the anode comprises an anode current collector 121 and an anode active material layer 122 on the anode current collector 121.

The anode current collector 121 may comprise a material that is not reactive with lithium, i.e., does not form either an alloy or a compound with lithium. A suitable material for the anode current collector 121 may be, for example, Cu, stainless steel, Ti, Fe, Co, or Ni. A combination comprising at least one of the foregoing may be used. The anode current collector 121 may comprise a single type of metal, an alloy of two or more metals, and may optionally comprise a coating on the metal. The shape of the anode current collector is not specific limited, the anode current collector may be rectilinear or curvilinear, and the anode current collector 121 may be, for example, in the form of a plate or foil. In an embodiment, the anode current collector 121 may be in the form of a clad foil.

Figure 3:
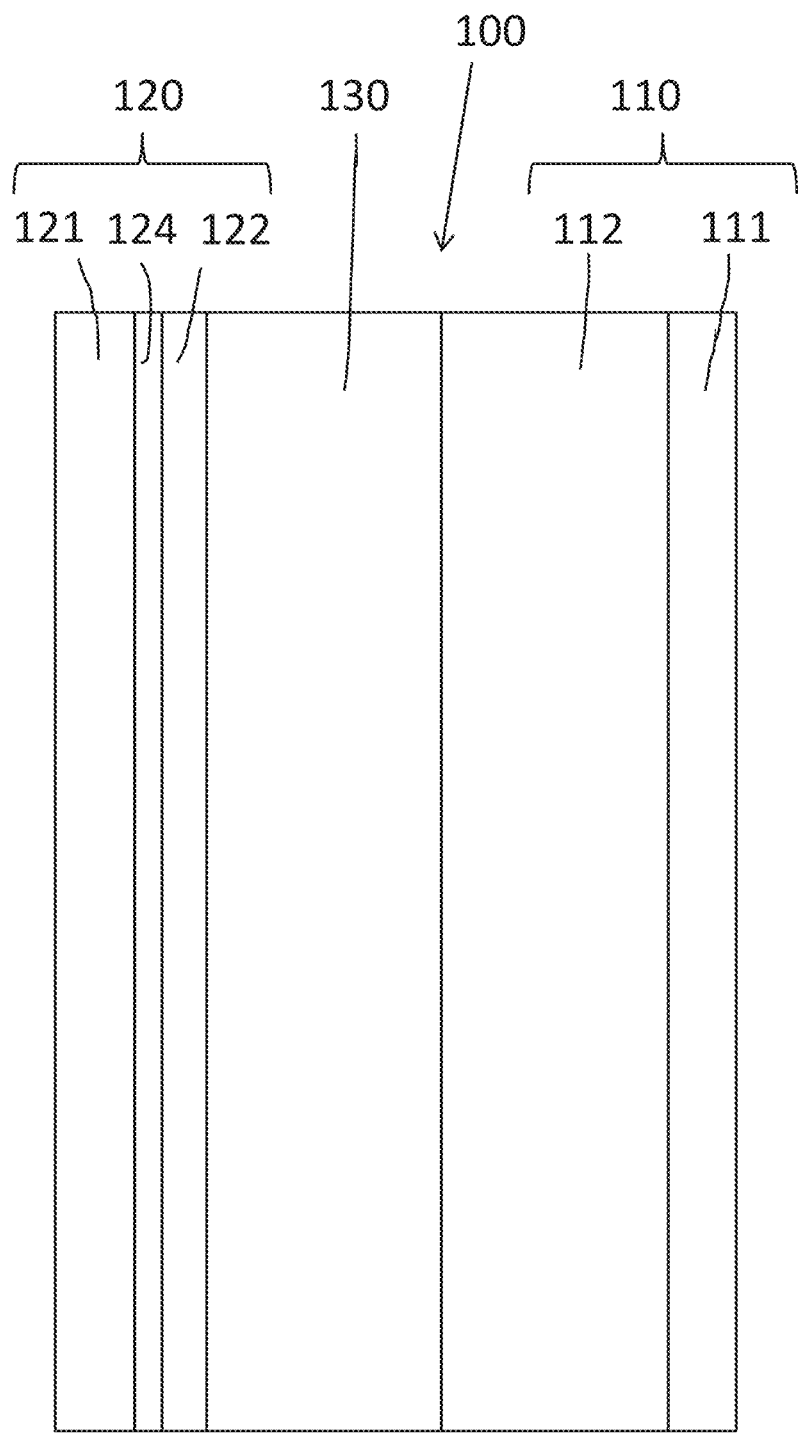
FIG. 3 is a schematic cross-sectional view illustrating a second embodiment of an all-solid-state secondary battery.

In an embodiment, as illustrated in FIG. 3, a plating layer 124 may be formed on a surface of the anode current collector 121. The plating layer 124 may be in the form of a thin film and may include an element (e.g., a metal) that is alloyable with lithium. As used herein, "alloyable with lithium" means that a material (e.g., element or metal) is capable of forming an alloy with lithium.

Figure 4:
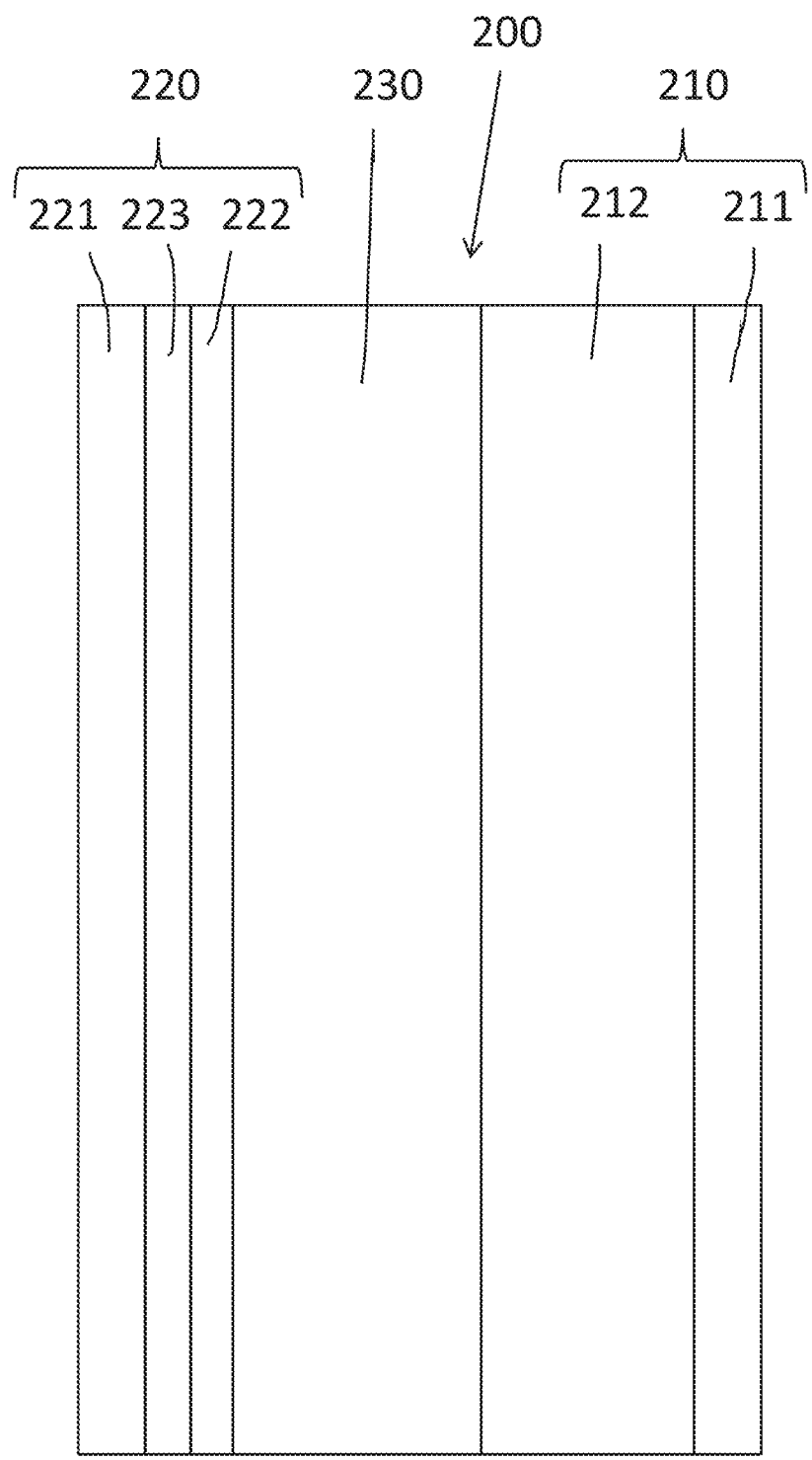
FIG. 4 is a schematic cross-sectional view illustrating an embodiment of a structure of a second embodiment of an all-solid-state secondary battery.

Examples of the element that is alloyable with lithium include gold (Au), silver (Ag), zinc (Zn), tin (Sn), indium (In), silicon (Si), aluminum (Al), and bismuth (Bi). The plating layer 124 may comprise at least one of the foregoing alloyable elements, or an alloy thereof. While not wanting to be bound by theory, it is understood that due to the presence of the plating layer 124, a deposition form of the metal layer 223 as shown in FIG. 4 may have reduced roughness, and may be smoother and/or flattened, and the all-solid-state secondary battery 200 may have enhanced characteristics.

Turning now to FIG. 3, in an embodiment, the thickness of the plating layer 124 is not particularly limited, and the thickness may range from about 1 nanometer (nm) to about 500 nm, about 2 nm to about 400 nm, or about 4 nm to about 300 nm. When the thickness of the plating layer 124 is less than 1 nm, the function of the plating layer 124 may not be sufficiently exhibited. Without being bound by theory, when the thickness of the plating layer 124 is greater than about 500 nm, the plating layer 124 itself may intercalate lithium, and thus a deposition amount of lithium at an anode is decreased, and, accordingly, the characteristics of the all-solid-state secondary battery 100 may deteriorate. The plating layer 124 may be formed on the anode current collector 121 by, for example, vacuum deposition, sputtering, plating, or the like.

The anode active material layer 122 comprises an anode active material that is alloyable with lithium, intercalates lithium, or forms a compound with lithium. The anode active material may comprise at least one of amorphous carbon, a metal, or a semiconductor. In other words, when used as the anode active material, at least one of the amorphous carbon, metal, and semiconductor are selected from materials that are alloyable with lithium, intercalate lithium, or form a compound with lithium. In this regard, the metal or the semiconductor may be, for example, gold (Au), platinum (Pt), palladium (Pd), silicon (Si), silver (Ag), aluminum (Al), bismuth (Bi), tin (Sn), and zinc (Zn), or a combination thereof. The amorphous carbon may be, for example, carbon black (CB), acetylene black (AB), furnace black (FB), Ketjen black (KB), graphene, or a combination thereof, or the like. An anode active material may comprise, for example, at least one of amorphous carbon, Au, Pt, Pd, Si, Ag, Al, Bi, Sn, or Zn. For example, amorphous carbon or at least one of Au, Pt, Pd, Si, Ag, Al, Bi, Sn, or Zn may be used. In another embodiment, the anode active material layer 22 may comprise amorphous carbon and at least one of Au, Pt, Pd, Si, Ag, Al, Bi, Sn, or Zn. For example, the anode active material layer 22 may include a Si particle that is coated with amorphous carbon, preferably wherein the coating has a thickness of about 1 nm to about 10 nm. In an embodiment the element that is alloyable with lithium may be omitted and only amorphous carbon used. A weight ratio of the amorphous carbon to the element that is alloyable with lithium may be about 10:1 to about 1:10, about 5:1 to about 1:5, or about 3:1 to about 1:3. In an embodiment, the content of the amorphous carbon may be about 10 wt % to about 99 wt %, about 20 wt % to about 95 wt %, or about 30 wt % to about 99 wt %, based on a total weight of the anode. In an embodiment, the amorphous carbon may be present in an amount of about 20 wt % to about 99 wt %, about 40 wt % to about 98 wt %, or about 60 wt % to about 95 wt %, based on a total weight of the anode active material layer. In an embodiment, the content of the element that is alloyable with lithium may be about 10 wt % to about 99 wt %, about 20 wt % to about 95 wt %, or about 30 wt % to about 99 wt %, based on a total weight of the anode. In an embodiment, the element that is alloyable with lithium may be present in an amount of about 20 wt % to about 99 wt %, about 40 wt % to about 98 wt %, or about 60 wt % to about 95 wt %, based on a total weight of the anode active material layer. When the anode active material includes these materials, the characteristics of the all-solid-state secondary battery 100 may be further enhanced.

An average particle size D50 (e.g., average particle diameter) of the anode active material may be about 4 micrometers (μm) or less, about 10 nm to about 1 μm, or about 10 nm to about 100 nm. As noted above, the average particle size D50 (e.g., average particle diameter) of the anode active material may be a median diameter D50 as measured by a laser light scattering. A lower limit of the particle diameter may be about 10 nm, but anode active material is not particularly limited thereto.

A ratio of charge capacity of the anode active material layer 122 to a charge capacity of the cathode active material layer 112, i.e., a capacity ratio, may satisfy Equation 1:

$$0.01<(b/a)<0.5 \qquad \text{Equation 1}$$

wherein a is the initial charge capacity of the cathode active material layer 112, determined from a first open circuit voltage to a maximum charging voltage vs. Li/Li$^+$, and wherein b is the initial charge capacity of the anode active material layer 122, determined from a second open circuit voltage to 0.01 Volts (V) vs. Li/Li$^+$. The charge capacities, a and b, are determined separately by using all-solid-state half-cells with Li counter electrodes from the first open circuit voltage to a maximum charging voltage (vs. Li/Li$^+$) for the cathode, and the second open circuit voltage to 0.01 V (vs. Li/Li$^+$) for the anode, respectively.

The maximum charging voltage of the cathode depends on the cathode active material. In an embodiment, the maximum charge voltage of the cathode active material is determined as the maximum voltage where a cell comprising the cathode active material satisfies the safety conditions described in Appendix A of "Safety Requirements For Portable Sealed Secondary Cells, And For Batteries Made From Them, For Use In Portable Applications", Japanese Standards Association, JISC8712:2015, the entire content of which is incorporated by reference herein. According to an embodiment, the maximum charging voltage can be about 3 volts (V) to about 5 V, about 3.5 V to about 4.5 V, or about 4.2 volts to about 5 volts, or about 4 V to about 4.4 V, or about 4.1 V to about 4.3 V, or about 4.2 V, or about 4.25 V. In an embodiment, e.g., when the cathode active material is lithium cobalt oxide (LCO), NCA, or NCM, the maximum charging voltage is 4.1 V or 4.2 V vs. Li/Li$^+$. In an embodiment, e.g., when the cathode active material is lithium cobalt oxide (LCO), NCA, or NCM, the maximum charging voltage is about 4.25 V vs. Li/Li$^+$.

In another embodiment, the ratio of the charge capacity of the anode active material layer to the initial charge capacity of the cathode active material layer satisfies a condition of Equation 1A:

$$0.01<(b/a)<0.25. \qquad \text{Equation 1A}$$

In yet another embodiment, the ratio of the initial charge capacity of the anode active material layer to the initial charge capacity of the cathode active material layer satisfies a condition of Equation 1B:

$$0.01<(b/a)<0.2. \qquad \text{Equation 1B}$$

In still another embodiment, the ratio of the initial charge capacity of the anode active material layer to the initial charge capacity of the cathode active material layer satisfies a condition of Equation 1C:

$$0.01<(b/a)<0.1. \qquad \text{Equation 1C}$$

In this regard, the charge capacity of the cathode active material layer 112 can be obtained by multiplying the charge specific capacity of the cathode active material by the mass of cathode active material in the cathode active material layer 112 as shown in Equation 2.

$$Q=q\cdot m \qquad \text{Equation 2}$$

wherein Q is the initial charge capacity (mAh), q is the specific capacity of the active material (mAh/g), and m is the mass of the active material (g).

When multiple cathode active materials are used, the initial charge capacity is determined based on the relative content of each cathode active material, e.g., by multiplying the charge specific capacity by the mass of each cathode active material, and a sum of these values is used as the initial charge capacity of the cathode active material layer 112. The initial charge capacity of the anode active material layer 122 is also calculated in the same manner. That is, the initial charge capacity of the anode active material layer 122 is obtained by multiplying charge specific capacity of the anode active material by the mass of anode active material in the anode active material layer 122. When multiple anode active materials are used, a value of the charge specific capacity multiplied by the mass for each anode active material is calculated, and a sum of these values is used as the initial charge capacity of the anode active material layer 122.

The charge specific capacity of each of the cathode and anode active materials may be determined using an all-solid-state half-cell using lithium metal as a counter electrode. The initial charge capacity of each of the cathode active material layer and the anode active material layer can be directly measured using separate all-solid-state half-cells at a current density of, for example, 0.1 milliamperes per square centimeter (mA/cm$^2$). For a cathode, the measurement can be made with an operating voltage (vs. Li/Li$^+$) from a first open circuit voltage (OCV) to the maximum charging voltage, for example 4.25 Volts (V). For the anode, the measurement can be made with an operating voltage (vs. Li/L*) from a second OCV to 0.01 V for the anode. For example, the all-solid state half-cell with the cathode active material layer can be charged at a constant current density of 0.1 mA/cm$^2$ from a first OCV to 4.25 V, and the all-solid state half-cell with the anode active material layer can be discharged with a constant current density of 0.1 mA/cm$^2$ from a first OCV to 0.01 V. In another embodiment, the all-solid-state half-cell with the cathode active material layer can be charged at a constant current density of 0.5 mA/cm$^2$ from a first OCV to 4.25 V, charged at a constant voltage of 4.25 V until the current density reached 0.2 mA/cm$^2$, and discharged at a constant current density of 0.5 mA/cm$^2$ until the voltage reached 2.0 V. For example, the cathode may be charged from a first OCV to about 3 V, or from a first OCV to about 4 V, or from a first OCV to about 4.1 V, or from a first OCV to about 4.2 V, or from a first OCV to about 5 V. The maximum charging voltage, or discharging bias, for the cathode is not limited thereto. The maximum operating voltage of the cathode active material can be determined as the maximum voltage where the cell satisfies the safety conditions according to the description in the Appendix A of "Safety Requirements For Portable Sealed Secondary Cells, And For Batteries Made From Them, For Use In Portable Applications", Japanese Standards Association, JISC8712:2015.

The all-solid-state half-cell can be prepared by pressing a solid state electrolyte material (e.g., 200 mg of $Li_6PS_5Cl$) at a pressure of 40 megapascals (MPa) to provide a pellet having a diameter of 1.3 cm and a thickness of 1 mm. The solid state electrolyte pellet is then disposed between electrode disks each having a diameter of 1.3 cm that are made from the respective cathode and anode active materials. The assembled layers are then sandwiched between two stainless steel disks, which are used as current collectors, and then subsequently disposed into a poly(tetrafluoroethylene) cylinder. This assembly is pressed at a pressure of about 300 MPa for 1 minute and then placed in a stainless steel outer casing. The assembled half-cell was then pressed at a pressure of about 22 MPa to maintain electrochemical contact during charge capacity measurements.

The charge specific capacity is calculated by dividing the initial charge capacity by the mass of each active material. The charge capacity of each of the cathode active material layer 112 and the anode active material layer 122 is an initial charge capacity measured during the 1$^{st}$ charge.

Figure 2:
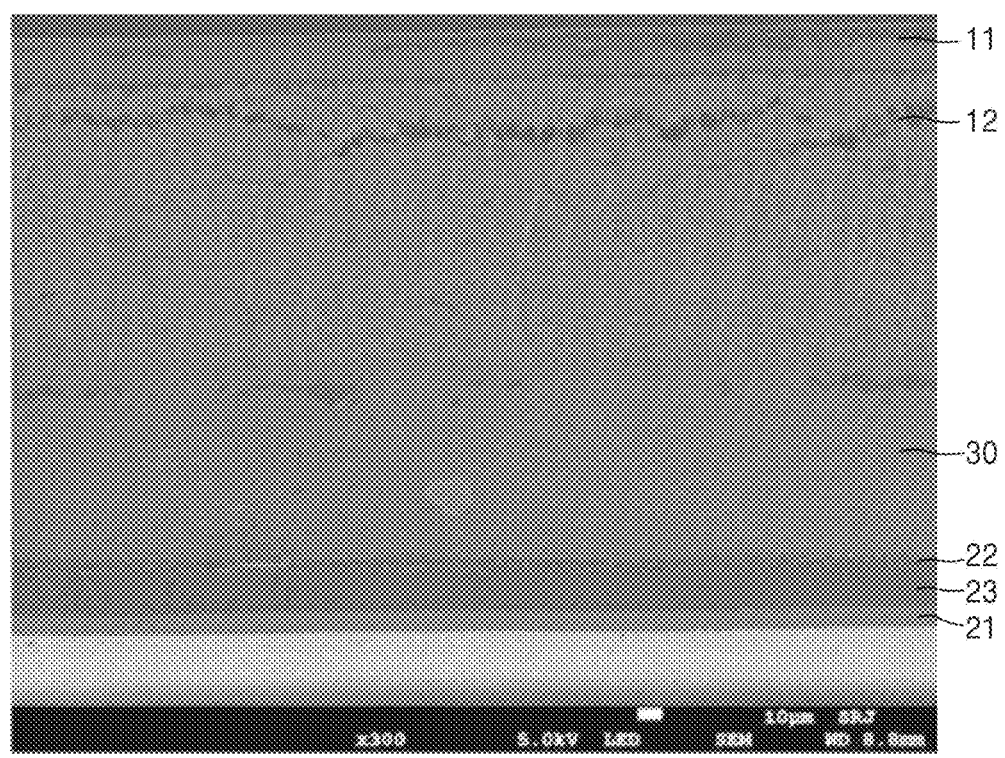
FIG. 2 is a scanning electron microscope (SEM) image of a cross-section of an all-solid-state secondary battery after overcharging an anode active material layer.

In an embodiment, the initial charge capacity of the cathode active material layer 112 exceeds the initial charge capacity of the anode active material layer 122. In an embodiment, when the all-solid-state secondary battery 100 is charged, the initial charge capacity of the anode active material layer 122 is exceeded. That is, the anode active material layer 122 is overcharged. As used herein, the term "overcharged" refers to a voltage greater than the open circuit voltage of the "fully-charged" battery or half-cell, and is further defined in Appendix A of "Safety Requirements For Portable Sealed Secondary Cells, And For Batteries Made From Them, For Use In Portable Applications", Japanese Standards Association, JISC8712:2015, the entire content of which is incorporated by reference herein. At the initial stage of charging, lithium is incorporated into the anode active material layer 122. As used herein, "incorporated" means the anode active material layer is capable of intercalating or alloying a lithium ion, or can form a compound with lithium (e.g., $CoO+2Li^+ \rightarrow Li_2O+Co$). That is, the anode active material may form an alloy or compound with a lithium ion transferred from the cathode 110. When charging is performed such that the initial charge capacity of the anode active material layer 122 is exceeded, as illustrated in FIG. 2, lithium is deposited on a surface, e.g., rear surface of the anode active material layer 122, i.e., between the anode current collector 121 and the anode active material layer 122, and the metal layer 123 is formed as a layer of lithium. The metal layer 123 may be primarily lithium (e.g., lithium metal). In an embodiment, the metal layer (i.e. lithium layer) can be deposited anywhere between the anode current collector and the solid electrolyte layer, for example within the anode active material layer, between the anode active material layer and the anode current collector, between the plating layer and the anode current collector, between the plating layer and the anode active material layer, or a combination thereof. Without being bound by theory, this may occur due to the use of a particular material, e.g., a material alloyable with lithium or a material capable of forming a compound with lithium, as an anode active material. During discharge, lithium of the anode active material layer 122 and the metal layer 123 is ionized and transferred to the cathode 110. Thus, in the all-solid-state secondary battery 100, lithium may be used as an anode active material. In addition, since the anode active material layer 122 covers the metal layer 123, the anode active material layer 122 may act as a protective layer for the metal layer 123, and also may inhibit the deposition and growth of dendrites. This may inhibit the short circuit and capacity reduction of the all-solid-state secondary battery 100, and furthermore, may enhance the characteristics of the all-solid-state secondary battery 100.

In an embodiment, the capacity ratio (i.e., b/a) is greater than 0.01. When the capacity ratio is 0.01 or less, the characteristics of the all-solid-state secondary battery 100 may deteriorate. While not wanting to be bound by theory, this is understood to be because the anode active material layer 122 may not sufficiently function as a protective layer. For example, when the thickness of the anode active material layer 122 is too small, the capacity ratio may be 0.01 or less. In this case, when charging and discharging are repeated, the anode active material layer 122 may collapse and a dendrite may be deposited and grow. As a result, the characteristics of the all-solid-state secondary battery 100 may deteriorate.

In another embodiment, the anode active material may further include a mixture of a first particle comprising an amorphous carbon and a second particle comprising a metal, a semiconductor, or a combination thereof. The metal or the semiconductor may include, for example, Au, Pt, Pd, Si, Ag, Al, Bi, Sn, Zn, a combination thereof, or the like. In this regard, the amount of the second particles may range from about 8 wt % to about 60 wt %, or about 10 wt % to about 50 wt %, with respect to a total weight of the mixture. In this case, the characteristics of the all-solid-state secondary battery 100 may be further enhanced. As used herein, the terms "mass" and "weight" are equivalent.

In an embodiment, the anode active material layer 122 may further include a binder. Examples of the binder may include, but are not limited to, styrene butadiene rubber (SBR), polytetrafluoroethylene, polyvinylidene fluoride, and polyethylene. One of these binders may be used, or two or more of these binders may be used.

When the anode active material layer 122 further includes a binder, the anode active material layer 122 may be stabilized on the anode current collector 121. For example, when the binder is not included in the anode active material layer 122, the anode active material layer 122 may be more easily detached from the anode current collector 121. A portion of the anode current collector 21, from which the anode active material layer 122 may be detached, is exposed, and thus a short circuit may occur. The anode active material layer 122 may be formed by, for example, by coating a slurry, in which materials constituting the anode active material layer 122 are dispersed, onto the anode current collector 121 and drying the coated anode current collector 121, which will be described below in further detail. By including a binder in the anode active material layer 122, the anode active material may be stably dispersed in the slurry. As a result, when the slurry is coated onto the anode current collector 121 by, for example, screen printing, clogging of a screen (e.g., clogging due to an aggregate of the anode active material) may be suppressed.

In an embodiment, when the binder is included in the anode active material layer 122, the amount of the binder may range from about 0.3 wt % to about 15 wt %, based on a total weight of the anode active material. When the amount of the binder is less than 0.3 wt %, based on a total weight of the anode active material, the strength of the active material layer, or an adhesion of the anode active material layer to the anode current collector, may be insufficient, and characteristics of the anode active material layer may deteriorate and it may be difficult to treat or handle the anode active material layer. When the amount of the binder is greater than 20 wt %, based on a total weight of the anode active material, the characteristics of the all-solid-state secondary battery 100 may deteriorate. In some embodiments, a lower limit of the amount of the binder may be about 3 wt %, based on a total weight of the anode active material. For example, the binder may be included in the anode active material layer 22 in an amount of about 3 wt % to about 15 wt %, based on a total weight of the anode active material.

The thickness of the anode active material layer 122 is not particularly limited as long as the anode active material layer satisfies the condition of Equation 1 above, and may range from about 1 μm to about 20 μm. When the thickness of the anode active material layer 22 is less than 1 μm, the characteristics of the all-solid-state secondary battery 1 may not be sufficiently enhanced. When the thickness of the anode active material layer 122 is greater than 20 μm, the anode active material layer 122 has a high resistance value, resulting in insufficient enhancement of the characteristics of the all-solid-state secondary battery 100. When the above-described binder is used, the thickness of the anode active material layer 122 may be adjusted to an appropriate level.

In an embodiment, the all-solid-state secondary battery may further include an additive in the anode active material layer 122. The additive may comprise a filler, a dispersant, or an ion conductive agent, or the like.

Solid Electrolyte Layer

The solid electrolyte layer 130 includes a solid electrolyte disposed between the cathode 110 and the anode 120.

The solid electrolyte may include, for example, a sulfide-based solid electrolyte material. The sulfide-based solid electrolyte material comprise, for example, $Li_2S$—$P_2S_5$, $Li_2S$—$P_2S_5$—LiX where X is a halogen element, e.g., iodine (I) or chlorine (Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ where m and n are positive numbers, and Z is one of germanium (Ge), zinc (Zn), and gallium (Ga), $Li_2S$—$GeS_2$, $Li_2S$—$SiS_2$—$Li_3PO_4$, $Li_2S$—$SiS_2$—$Li_pMO_q$ where p and q are positive numbers, and M is one of phosphorus (P), silicon (Si), germanium (Ge), boron (B), aluminum (Al), gallium (Ga), and indium (In), or the like. In this regard, the sulfide-based solid electrolyte material is prepared by treating a starting material (e.g., $Li_2S$, $P_2S_5$, or the like) by a metal quenching method, a mechanical milling method, or the like. In addition, heat treatment may be performed after the treatment. The solid electrolyte may be amorphous, crystalline, or in a mixed form.

In an embodiment, the sulfide-based solid electrolyte material may include at least sulfur (S), phosphorus (P), and lithium (Li) as constitutional elements, and in a particular embodiment a material including $Li_2S$—$P_2S_5$ may be used. However, these examples are provided for illustrative purposes only, and suitable materials may vary.

In an embodiment, when the material including $Li_2S$—$P_2S_5$ is used as a sulfide solid electrolyte material for forming the solid electrolyte, a mixing molar ratio of $Li_2S$ to $P_2S_5$ may be range from, for example, about 50:50 to about 90:10. In addition, the solid electrolyte layer 130 may further include a binder. The binder included in the solid electrolyte layer 130 may be, for example, SBR, polytetrafluoroethylene, polyvinylidene fluoride, polyethylene, polyacrylic acid, or the like. The binder of the solid electrolyte layer 30 may be identical to or different from the binders of the cathode active material layer 112 and the anode active material layer 122.

Method of Manufacturing All-Solid-State Secondary Battery

Hereinafter, a method of manufacturing the all-solid-state secondary battery 100 according to an embodiment will be described. The all-solid-state secondary battery 100 according to the present embodiment may be manufactured by fabricating the cathode 110, the anode 120, and the solid electrolyte layer 130, and then stacking these layers.

Cathode Formation

First, materials (e.g., a cathode active material, a binder, and the like) for forming the cathode active material layer 112 are added to a non-polar solvent to prepare a slurry (the slurry may be a paste, it is also applied to other slurries). Subsequently, the prepared slurry is coated onto the cathode current collector 111 and dried. Thereafter, the obtained stacked structure is pressed (e.g., pressing using hydrostatic or hydraulic pressure), thereby completing the formation of the cathode 110. The pressing process may be omitted in some embodiments. A mixture of materials for forming the cathode active material layer 112 may be subjected to compaction molding into a pellet form or elongated (molding) into a sheet form, thereby completing the formation of the cathode 110. When the cathode 110 is formed using this method, the cathode current collector 111 may be omitted.

Anode Formation

First, materials (e.g., an anode active material, a binder, and the like) for forming the anode active material layer 122 are added to a polar solvent or a non-polar solvent to prepare a slurry. Subsequently, the prepared slurry is coated onto the anode current collector 121 and dried. Thereafter, the obtained stacked structure is pressed (e.g., pressing using hydrostatic or hydraulic pressure), thereby completing the formation of the anode 20. The pressing process is optional and may be omitted.

Formation of Solid Electrolyte Layer

The solid electrolyte layer 30 may be formed using a solid electrolyte formed of a sulfide-based solid electrolyte material.

First, a solid electrolyte starting material is treated by melt quenching or mechanical milling.

For example, when the melt quenching is used, starting materials (e.g., $Li_2S$, $P_2S_5$, and the like) may be mixed in certain amounts to prepare a pellet form, and the prepared pellet form may be allowed to react in a vacuum state at a predetermined reaction temperature, followed by quenching, thereby completing the preparation of the sulfide solid electrolyte material. In an embodiment, the reaction temperature of the mixture of $Li_2S$ and $P_2S_5$ ranges from, for example, about 400° C. to about 1,000° C., or about 800° C. to about 900° C. In another embodiment, reaction time may range from, for example, about 0.1 hours to about 12 hours, or about 1 hour to about 12 hours. In still another embodiment, a quenching temperature of the reaction product is 10° C. or less, or 0° C. or less, and a quenching rate of the reaction product ranges from about 1° C./sec to about 10,000° C./sec, or about 1° C./sec to about 1,000° C./sec.

In an embodiment, when mechanical milling is used, solid electrolyte starting materials (e.g., $Li_2S$, $P_2S_5$, and the like) may be allowed to react while stirred using a ball mill or the like, thereby preparing a sulfide-based solid electrolyte material. In another embodiment, a stirring rate and stirring time of the mechanical milling method are not particularly limited, but the faster the stirring rate, the faster the production rate of the sulfide-based solid electrolyte material, and the longer the stirring time, the higher the conversion rate of raw materials into the sulfide-based solid electrolyte material.

Thereafter, the mixed starting materials obtained by melt quenching or mechanical milling may be heat-treated at a predetermined temperature and then pulverized, thereby preparing a solid electrolyte having a particle form. When the solid electrolyte has glass transition properties, the solid electrolyte may be converted to a crystalline form from an amorphous form by heat treatment.

Subsequently, the solid electrolyte obtained using the method may be deposited using a known film formation method, for example, by aerosol deposition, cold spraying, sputtering, or the like, thereby preparing the solid electrolyte layer 30. In still another embodiment, the solid electrolyte layer 30 may be formed by pressing solid electrolyte particles. In yet another embodiment, the solid electrolyte layer 30 may be formed by mixing the solid electrolyte with a solvent and a binder, followed by coating, drying, and pressing, thereby completing the formation of the solid electrolyte layer 30.

Manufacture of All-Solid-State Secondary Battery

The cathode 110, the anode 120, and the solid electrolyte layer 130, which are formed using the above-described methods, are stacked such that the solid electrolyte layer 130 is arranged between the cathode 110 and the anode 120, followed by pressing (e.g., pressing using hydrostatic or hydraulic pressure), thereby completing the manufacture of the all-solid-state secondary battery 100.

For example, the all-solid-state secondary battery 100 may be pressed during the manufacturing operation. The pressing may be applied by sandwiching the assembled battery between two hard plates made from stainless steel, brass, aluminum, glass, or the like, and tightening with screws to apply pressure. The applied pressure may be about 0.5 MPa to about 10 MPa.

Method of Charging All-Solid-State Secondary Battery

A method of charging the all-solid-state secondary battery 100 will now be described. In an embodiment, the all-solid-state secondary battery 100 is charged such that the initial charge capacity of the anode active material layer 122 is exceeded. That is, the anode active material layer 122 is overcharged. At the initial stage of charging, lithium is incorporated into the anode active material layer 122. Without being bound by theory, the anode active material layer can be overcharged when lithium electrochemically reacts on the interface between the anode active material layer and the solid electrolyte layer. The reacted lithium may diffuse within the anode active material particles, and when overcharged, the lithium atoms may precipitate at or near the current collector. When charging is performed such that the initial charge capacity of the anode active material layer 122 is exceeded, as illustrated in FIG. 2, lithium is deposited on a rear surface of the anode active material layer 122, i.e., between the anode current collector 121 and the anode active material layer 122, and the metal layer 123 is formed by such lithium deposition. During discharge, lithium of the anode active material layer 122 and the metal layer 123 are ionized and transferred to the cathode 110. In this regard, the anode active material layer is capable of incorporating, e.g., intercalating or alloying, and capable of deincorporating, e.g., deintercalating or dealloying, a lithium ion. Thus, in the all-solid secondary battery 100, lithium may be used as an anode active material. In addition, since the anode active material layer 122 covers the metal layer 123, the anode active material layer 122 may act as a protective layer for the metal layer 123, and also inhibit the deposition and growth of dendrites. This inhibits the short circuit and capacity reduction of the all-solid-state secondary battery 100, and furthermore, may enhance characteristics of the all-solid-state secondary battery 100. In addition, in the first embodiment, since the metal layer 123 is not previously formed, manufacturing costs of the all-solid secondary battery 100 may be reduced. In this case, the anode current collector 121, the anode active material layer 122, and a region (interface) therebetween may be Li-free regions at an initial state of or after discharging of the all-solid-state secondary battery 100.

Structure of All-Solid-State Secondary Battery of FIG. 4

Next, a structure of an all-solid-state secondary battery 200 according to another embodiment will be described with reference to FIG. 4. As illustrated in FIG. 4, the all-solid-state secondary battery 200 includes the cathode 210, the anode 220, and the solid electrolyte layer 230. Configurations of the cathode 210 and the solid electrolyte layer 230 are the same as those described for FIG. 1.

Anode

The anode 220 includes the anode current collector 221, the anode active material layer 222, and the metal layer 223. That is, according to an embodiment the metal layer 223 is formed between the anode current collector 221 and the anode active material layer 222 by overcharging of the anode active material layer 222. According to another embodiment, the metal layer 223 is previously (i.e., prior to initial charging) formed between the anode current collector 221 and the anode active material layer 222.

Configurations of the anode current collector 221 and the anode active material layer 222 are the same as those described above. The metal layer 223 may include lithium or a lithium alloy. That is, the metal layer 223 may function as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, a Li—Si alloy, or the like. The metal layer 223 may be formed of one of these alloys or lithium, or an alloy thereof. In an embodiment shown in FIG. 4, since the metal layer 223 acts as a lithium reservoir, the all-solid-state secondary battery 1a may have further enhanced characteristics.

In an embodiment, the thickness of the metal layer 223 may range from about 1 μm to about 200 μm, but is not particularly limited. When the thickness of the metal layer 223 is less than 1 μm, the function of the metal layer 223 as a reservoir may not be sufficiently exhibited. When the thickness of the metal layer 223 is greater than 200 μm, the mass and volume of the all-solid-state secondary battery 1a may be increased, resulting in rather deteriorated characteristics. The metal layer 223 may be, for example, metal foil having a thickness within the above-described range.

Method of Manufacturing All-Solid-State Secondary Battery

Hereinafter, a method of manufacturing the all-solid-state secondary battery 200 according to the second embodiment will be described. The cathode 210 and the solid electrolyte layer 230 are formed in the same manner as in the first embodiment.

Anode Formation

In an embodiment depicted in FIG. 4, the anode active material layer 222 is arranged on the metal layer 223. In an embodiment, the metal layer 223 may include a metal foil. Since it is difficult to form the anode active material layer 222 on Li foil or Li alloy foil, the anode 220 may be formed using the following method.

First, the anode active material layer 222 is formed on a certain base material (e.g., a Ni plate) using the same method as that described above. In particular, materials for forming the anode active material layer 222 are added to a solvent to prepare a slurry. Subsequently, the prepared slurry is coated onto a base material and dried. Thereafter, the obtained stacked structure is pressed (e.g., pressing using hydrostatic or hydraulic pressure), thereby forming the anode active material layer 222 on the base material. The pressing process may be omitted.

Subsequently, the stacked structure obtained by stacking the solid electrolyte layer 230 on the anode active material layer 222 is subjected to pressing (e.g., pressing using hydrostatic or hydraulic pressure). Thereafter, the base is removed. Through this, the stacked structure of the anode active material layer 222 and the solid electrolyte layer 230 is fabricated.

Subsequently, metal foil including the metal layer 223, the stacked structure of the anode active material layer 222 and the solid electrolyte layer 230, and the cathode 210 are sequentially stacked on the anode current collector 221 in that order. Thereafter, the obtained stacked structure is pressed (e.g., pressing using hydrostatic or hydraulic pressure), thereby completing the manufacture of the all-solid-state secondary battery 200.

For example, the all-solid-state secondary battery 200 may be pressed during the manufacturing operation. The pressure may be applied by sandwiching the assembled battery between two hard plates made from stainless steel, brass, aluminum, glass, or the like, and tightening with screws to apply pressure. The applied pressure may be about 0.5 MPa to about 10 MPa Method of Charging All-Solid-State Secondary Battery The method of charging the all-solid-state secondary battery 200 is the same as that described above. That is, the all-solid-state secondary battery 200 is charged such that the initial charge capacity of the anode active material layer 222 is exceeded. That is, the anode active material layer 222 is overcharged. At the initial stage of charging, lithium is incorporated into the anode active material layer 222. When charging is performed such that the initial charge capacity of the anode active material layer 222 is exceeded, lithium is deposited in the metal layer 223 (or on the metal layer 223). During discharging, lithium in the anode active material layer 222 and the metal layer 223 (or on the metal layer 223) are ionized and transferred to the cathode 210. Thus, in the all-solid-state secondary battery 200, lithium may be used as an anode active material. In addition, the anode active material layer 222 covers the metal layer 223, and thus may act as a protective layer for the metal layer 222, and also inhibit the deposition and growth of dendrites. This inhibits the short circuit and capacity reduction of the all-solid-state secondary battery 200, and furthermore, may enhance characteristics of the all-solid-state secondary battery 200. An initial charge capacity of the all-solid-state secondary battery may be about two times to about 100 times the initial charge capacity of the anode active material layer 222.

EXAMPLES

Hereinafter, the above-described embodiments will be described in further detail. For the furnace black particles used below, they are defined as follows based on particle size: furnace black powder (FB-A) particles having an average primary particle diameter D50 of about 12 nm; furnace black (FB-B) particles having an average primary particle diameter D50 of about 38 nm; and furnace black (FB-C) particles having an average particle diameter D50 of about 76 nm.

Example 1

In Example 1, an all-solid-state secondary battery was manufactured using the following method.

Cathode Formation $LiNi_{0.8}Co_{0.15}Mn_{0.05}O_2$ (NCM) was prepared as a cathode active material. A $Li_2O$—$ZrO_2$ thin layer was coated on the surface of the NCM particles using the same method described in Naoki Suzuki et al. "Synthesis and Electrochemical Properties of 14 Type $Li_{1+2x}Zn_{1-x}PS_4$ Solid Electrolyte", Chemistry of Materials, 30, 2236-2244 (2018), the content of which is incorporated herein by reference. In addition, $Li_6PS_5Cl$, which is Argyrodite-type crystal structure, was prepared as a solid electrolyte. In addition, polytetrafluoroethylene (Teflon binder available from DuPont) was prepared as a binder. In addition, carbon nanofibers (CNFs) were prepared as a conductive agent. Subsequently, these materials were mixed in a weight ratio of cathode active material:solid electrolyte:conductive agent:binder=85:15:3:1.5, and the resulting mixture was molded into a sheet form and cut into to a square shape having a length of about 1.7 cm, thereby completing the fabrication of a cathode sheet. In addition, the cathode sheet was pressed on Al foil having a thickness of 18 micrometers (μm) as a cathode current collector to form a cathode. An initial specific charge capacity (charge capacity at the $1^{st}$ cycle per unit weight) of the cathode active material was estimated to be about 240 mAh/g using a half-cell as described above. The mass of the cathode sheet was about 110 mg, corresponding to an initial charge capacity of the cathode about 22 mAh as determined from the initial specific charge capacity of the cathode active material multiplied by the mass (g) of the cathode active material.

Anode Formation

The anode was formed by the following process.

Ni foil having a thickness of 10 μm was prepared as an anode current collector. In addition, furnace black powder (FB-A) having an average primary particle diameter D50 of about 12 nm was prepared as an anode active material.

Subsequently, 2 g of FB-A is put in a container, and 900 mg of an N-methyl-pyrrolidone (NMP) solution including 6.67 wt % of a polyvinylidene fluoride binder (KF-polymer #9300 manufactured by Kureha, Inc.) (3.0 wt % based on the weight of the anode) was added thereto. Then, the mixture was stirred while slowly adding a total of 20 g of NMP thereto to prepare an anode slurry. The anode slurry was coated onto Ni foil using a blade coater, and dried in air at 80° C. for 20 minutes. The obtained stacked structure was further dried under vacuum at 100° C. for 12 hours and cut into a square with a length of about 2 cm, and with a protrusion for the termination. The anode had an initial charge capacity of about 1.2 mAh.

The ratio of initial charge capacity of the anode to initial charge capacity of the cathode satisfies a condition of Equation 1

$$0.01<(b/a)<0.5 \quad \text{Equation 1}$$

wherein a is the initial charge capacity of the cathode determined from a first open circuit voltage to a maximum charge voltage of 4.25 Volts vs. Li/Li$^+$, and b is the initial charge capacity of the anode determined from a second open circuit voltage to 0.01 Volts vs. Li/Li$^+$. For Example 1, b/a of Equation 1 was about 0.055, which satisfies the condition of Equation 1.

Formation of Solid Electrolyte Layer

A solid electrolyte layer was formed by the following process.

An acrylic binder was added to the Li$_6$PS$_5$Cl solid electrolyte to form a mixture, such that the mixture included 1% by weight of the binder with respect to the weight of the mixture. The resulting mixture was stirred while adding xylene and diethylbenzene thereto to prepare a slurry. The slurry was coated onto a non-woven fabric using a blade coater, and dried in air at 40° C. The resulting stacked structure was dried in a vacuum state at 40° C. for 12 hours, and cut into a square having a length of about 2.2 cm.

Manufacture of All-Solid-State Secondary Battery

The cathode, the solid electrolyte layer, and the anode were stacked together in this order and encapsulated in a laminating film in a vacuum state to manufacture an all-solid-state secondary battery. In this regard, a part of each of the cathode current collector and the anode current collector was allowed to protrude to the outside from the laminating film so as not to break the vacuum state of the battery. These protrusions were used as terminals for the cathode and the anode. In addition, the all-solid-state secondary battery was subjected to hydraulic pressure treatment at 490 megapascals (MPa) for 30 minutes. Battery characteristics are significantly enhanced by performing such hydrostatic pressure treatment. After this treatment, the all-solid-state battery was sandwiched between two 1 cm thick stainless steel plates and kept pressed at 4 MPa using four screws during the charge/discharge test.

Charge/Discharge Test

Charge/discharge characteristics of the manufactured all-solid-state secondary battery were evaluated by the following charge/discharge test. The all-solid-state secondary battery was placed in a thermostatic bath at 60° C. At the 1$^{st}$ cycle, the battery was charged at a constant current density of 0.5 milliamperes per square centimeter (mA/cm$^2$) until the voltage reached 4.1 V, and was charged at a constant voltage of 4.1 V until the current reached 0.2 milliamperes (mA). Thereafter, the battery was discharged at a constant current density of 0.5 mA/cm$^2$ until the voltage reached 2.0 V. After the 2$^{nd}$ cycle, the charging process was performed under the same conditions as that of the 1$^{st}$ cycle of charging, and the discharging process was performed at a current density of 1.67 mA/cm$^2$. The charging and discharging processes were stably repeated through the 17$^{th}$ cycle. During the 18$^{th}$ cycle of charging, a short circuit occurred. An initial discharge specific capacity (discharge capacity at the 1$^{st}$ cycle divided by the weight of the cathode active material) was 175 mAh/g, and an average cycle retention was about 99.9% per cycle. Charge/discharge characteristics were measured and the results thereof are listed in Table 1.

The average cycle retention was obtained according to Equation 2:

$$\text{Average cycle retention (\%)} = [(\text{discharge capacity at the final cycle/discharge capacity at the 2}^{nd} \text{ cycle})/(\text{total number of cycles}-2)] \times 100\%. \quad \text{Equation 2}$$

Example 2

Observation of Cross-Section Using Scanning Electron Microscope (SEM)

An all-solid-state secondary battery manufactured in the same manner as in Example 1 was charged only once under the same conditions as those in Example 1. Thereafter, the battery was disassembled in a dry environment and a cross-section of the all-solid-state secondary battery was polished using an ion milling device, and then observed using an SEM. As illustrated in FIG. 2, it was observed that lithium was deposited by charging at an interface between the Ni foil and a FB-A layer.

Comparative Example 1

In the present example, Ni foil was prepared as an anode current collector, and this was directly used as an anode. An all-solid-state secondary battery was manufactured in the same manner as in Example 1, except that this anode was used, and a test was performed thereon. That is, in Comparative Example 1, an anode active material layer was not formed on the anode current collector. An initial discharge specific capacity was 177 mAh/g, and a short circuit occurred after three cycles of charging. Charge/discharge characteristics were measured and the results thereof are listed in Table 1.

Examples 3A to 3G

Results Obtained After Changing Binder Amount

All-solid-state secondary batteries were manufactured in the same manner as in Example 1, except that the anodes were fabricated using anode slurries having different amounts of binder to provide anodes having 0.3 wt % to 20 wt % of binder based on the weight of the anode. Examples 3A to 3G were prepared using seven anode slurries from mixtures including 2 g of FB-A and 90 mg (0.3 wt %), 150 mg (0.5 wt %), 300 mg (1 wt %), 1.5 g (5 wt %), 3 g (10 wt %), 4.5 g (15 wt %), or 6 g (20 wt %), respectively, of the NMP solution including 6.67 wt % of binder from Example 1.

All-solid-state secondary batteries were manufactured in the same manner as in Example 1, except that anodes were fabricated using these slurries. The initial charge capacities of the anodes of each of the all-solid-state secondary batteries were about 1.2 mAh to about 1.8 mAh, which satisfy the condition of Equation 1. Charge/discharge characteristics were measured using the same method as that used in Example 1. The results thereof are listed in Table 1. From these results, it can be seen that when the amount of the binder ranges from 0.3 wt % to 15 wt % with respect to the weight of the anode, short-circuit inhibitory effects may be obtained. However, when the amount of the binder is 0.3 wt %, characteristics such as average capacity retention and total number of cycles deteriorated, and the formed film weakened such that handling thereof was difficult. When the amount of the binder is 20 wt %, lithium does not satisfactorily permeate the FB-A film during charging and a short circuit occurred at the 2nd cycle.

TABLE 1

| | Anode Binder [wt %] | Initial Cathode Charge Capacity (a) [mAh] | Initial Anode Charge Capacity (b) [mAh] | b/a | Initial Discharge Specific Capacity [mAh/g] | Capacity Retention [%/cycle] | Total Cycles [n] |
|---|---|---|---|---|---|---|---|
| Example 1 | 3.0% | 22 | 1.2 | 0.055 | 175 | 99.9 | 17 |
| Example 3A | 0.3% | 22 | 1.2 | 0.055 | 174 | 83.1 | 6 |
| Example 3B | 0.5% | 22 | 1.8 | 0.082 | 173 | 99.4 | 20 |
| Example 3C | 1.0% | 22 | 1.8 | 0.082 | 176 | 99.9 | 23 |
| Example 3D | 5.0% | 22 | 1.8 | 0.082 | 170 | 99.4 | 33 |
| Example 3E | 10.0% | 22 | 1.8 | 0.082 | 160 | 99.5 | 30 |
| Example 3F | 15.0% | 22 | 1.8 | 0.082 | 156 | 95.4 | 5 |
| Example 3G | 20.0% | 22 | 1.8 | 0.082 | 150 | — | 1 |
| Comparative Example 1 | — | 22 | 0.0 | 0.000 | 177 | — | 2 |

Examples 4A to 4E

An anode was formed using the following process.

In the present example, water was used as a solvent for preparing an anode slurry and styrene butadiene rubber (SBR) was used as a binder (ZEON BM-451B). 20 mg of carboxymethylcellulose and 5 g of water were added to 2 g of FB-A. Subsequently, the mixture was stirred while slowly adding 10 g of water thereto, and finally, an amount of an aqueous solution including 40 wt % of SBR binder was added to the resulting solution, followed by stirring, to prepare an anode slurry. The amounts of the aqueous SBR binder solution in Examples 4A to 4E were 133 mg (3 wt %), 250 mg (5 wt %), 500 mg (10 wt %), 750 mg (15 wt %), and 1 g (20 wt %), respectively, where the weight percent of the SBR binder is based on the weight of the anode. Each of these five anode slurries was coated onto Ni foil using a blade coater, and dried in air at 80° C. for 20 minutes. The resulting stacked structure was further dried at 145° C. for 12 hours. The initial charge capacities of the anodes were about 1.2 mAh, which satisfies the condition of Equation 1.

All-solid-state secondary batteries were manufactured in the same manner as in Example 1, except that these anodes were used, and charge/discharge characteristics were measured using the same method as that used in Example 1. The results thereof are listed in Table 2 below. From these results, it can be seen that when the amount of the binder ranges from 3 wt % to 15 wt % with respect to the anode, short-circuit inhibitory effects may be obtained. When the amount of the binder was 20 wt %, lithium does not permeate the FB-A film during charging, and a short circuit occurred at the $2^{nd}$ cycle.

Examples 5A and 5B

In the present example, Ni foil having a thickness of 10 μm was prepared as an anode current collector. A gold (Au) thin film having a thickness of about 20 nm (Example 5A) or about 100 nm (Example 5B) were formed on the Ni foil using a DC sputtering device. The anode slurry prepared according to Example 1 was coated onto each of the Au thin films to form two different anodes. An initial charge capacity of each anode was about 1.2 mAh. Thus, b/a of Equation 1 was 0.055, which satisfies the condition of Equation 1.

All-solid-state secondary batteries were manufactured in the same manner as in Example 1, except that these anode were used, and charge/discharge characteristics were measured using the same method as that used in Example 1. The results thereof are shown in Table 2. From these results, it was confirmed that a short circuit inhibitory effect was enhanced due to the formation of the Au thin films on the current collector.

Example 6

In the present example, Ni foil having a thickness of 10 μm was prepared as an anode current collector. A tin (Sn) plating layer was formed on the Ni foil. The thickness of the Sn plating layer was about 500 nm. The anode slurry prepared according to Example 1 was coated onto the Sn thin film of the Ni foil to form an anode. An initial charge capacity of the anode was about 1.4 mAh. Thus, b/a of Equation 1 is 0.064, which satisfies the condition of Equation 1.

An all-solid-state secondary battery was manufactured in the same manner as in Example 1, except that this anode was used, and charge/discharge characteristics were measured using the same method as that used in Example 1. The results, as provided in Table 2, showed that charging and discharging were stably performed to the $100^{th}$ cycle or more. The term "or more" as used herein means that a short circuit did not occur up to $100^{th}$ cycle, and thus a cycle testing was stopped.

TABLE 2

| | Anode Binder [wt %] | Initial Cathode Charge Capacity (a) [mAh] | Initial Anode Charge Capacity (b) [mAh] | b/a | Initial Discharge Specific Capacity [mAh/g] | Capacity Retention [%/cycle] | Total Cycles [n] |
|---|---|---|---|---|---|---|---|
| Example 4A | 3.0% | 22 | 1.2 | 0.055 | 165 | 99.1 | 6 |
| Example 4B | 5.0% | 22 | 1.2 | 0.055 | 161 | 99.4 | 79 |
| Example 4C | 10.0% | 22 | 1.2 | 0.055 | 171 | 99.6 | 59 |

TABLE 2-continued

|  | Anode Binder [wt %] | Initial Cathode Charge Capacity (a) [mAh] | Initial Anode Charge Capacity (b) [mAh] | b/a | Initial Discharge Specific Capacity [mAh/g] | Capacity Retention [%/cycle] | Total Cycles [n] |
|---|---|---|---|---|---|---|---|
| Example 4D | 15.0% | 22 | 1.2 | 0.055 | 165 | 99.1 | 15 |
| Example 4E | 20.0% | 22 | 1.2 | 0.055 | 156 | — | 1 |
| Example 5A | 1.0% | 22 | 1.2 | 0.055 | 172 | 99.6 | 39 |
| Example 5B | 1.0% | 22 | 1.2 | 0.055 | 173 | 99.7 | 65 |
| Example 6 | 3.0% | 22 | 1.4 | 0.064 | 150 | 99.7 | >100 |

Example 7A

In the present example, acetylene black (AB) having an average primary particle diameter D50 of about 35 nm was used as an anode active material. First, 2 g of AB active material was put into a container, and then 900 mg of an NMP solution including 6.67 wt % of a binder (KF-polymer #9300 available from Kureha Inc.) was added thereto. Subsequently, the mixture was stirred while slowly adding NMP thereto to prepare an anode slurry. NMP was added until the viscosity of the anode slurry became a state suitable for film formation using a blade coater. The prepared anode slurry was coated onto Ni foil using a blade coater, and dried in air at 80° C. for 20 minutes. The resulting stacked structure was then dried under vacuum at 100° C. for 12 hours. An anode including AB was formed by the above-described processes.

An all-solid-state secondary battery was manufactured in the same manner as in Example 1, except that the anode including AB was used, and charge/discharge characteristics were measured using the same method as that used in Example 1. The results thereof are listed on Table 3 below. Charging and discharging processes were stably performed up to the 100$^{th}$ cycle or more for the case of the all-solid-state secondary battery including the AB anode.

Example 7B

In the present example, Ketjen black (KB) having an average primary particle diameter D50 of about 39.5 nm was used as an anode active material. First, 2 g of KB active material was put into a container, and then 300 mg of an NMP solution including 6.67 wt % of a binder (KF-polymer #9300 available from Kureha Inc.) was added thereto. Subsequently, the mixture was stirred while slowly adding NMP thereto to prepare an anode slurry. NMP was added until the viscosity of the anode slurry became a state suitable for film formation using a blade coater. The prepared anode slurry was coated onto Ni foil using a blade coater, and dried in air at 80° C. for 20 minutes. The resulting stacked structure was then dried under vacuum at 100° C. for 12 hours. An anode including KB was formed by the above-described processes.

An all-solid-state secondary battery was manufactured in the same manner as in Example 1, except that the anode including KB was used, and charge/discharge characteristics were measured using the same method as that used in Example 1. The results thereof are listed on Table 3 below. Charging and discharging processes were stably performed up to the 40$^{th}$ cycle or more for the case of the all-solid-state secondary battery including the KB anode.

Examples 8A to 8D

Reviews on Thickness of Anode Active Material Layer

In the present example, Examples 8A to 8D included films having a thickness of 1.5 μm, 6 μm, 12 μm, and 18 μm, respectively, that were formed using AB as an anode active material, and each film was used as an anode. All-solid-state secondary batteries were manufactured in the same manner as in Example 7A, except that these anodes were used, and charge/discharge characteristics were measured using the same method as that used in Example 1. The results thereof were listed in Table 3 below. In the case in which the thickness of the anode was 1.5 μm, a short circuit inhibitory effect was shown. In addition, although it was confirmed that cycle lifespan was extended when the thickness of the anode was greater, specific charge capacity at the 2$^{nd}$ cycle decreased, i.e., from greater than about 150 mAh/g to about 140 mAh/g when the thickness of the anode was about 18 μm. This indicates that as the thickness of the film increases, the anode has an increased resistance, resulting in deterioration of output characteristics.

Comparative Examples 2A and 2B

In the present examples, all-solid-state secondary batteries were manufactured in the same manner as in Example 6, except that powder-type spherical graphite particles having an average primary particle diameter D50 of about 15 μm (Comparative Example 2A) or powder-type scaly graphite particles having an average primary particle diameter D50 of about 5 μm (Comparative Example 2B) were used as anode active materials, and a test was performed thereon. The results thereof are shown in Table 3 below. In both cases, a short circuit occurred during the 2$^{nd}$ cycle of charging.

Comparative Examples 3A and 3B

Observation of Cross-Section Using SEM

Figure 5A:
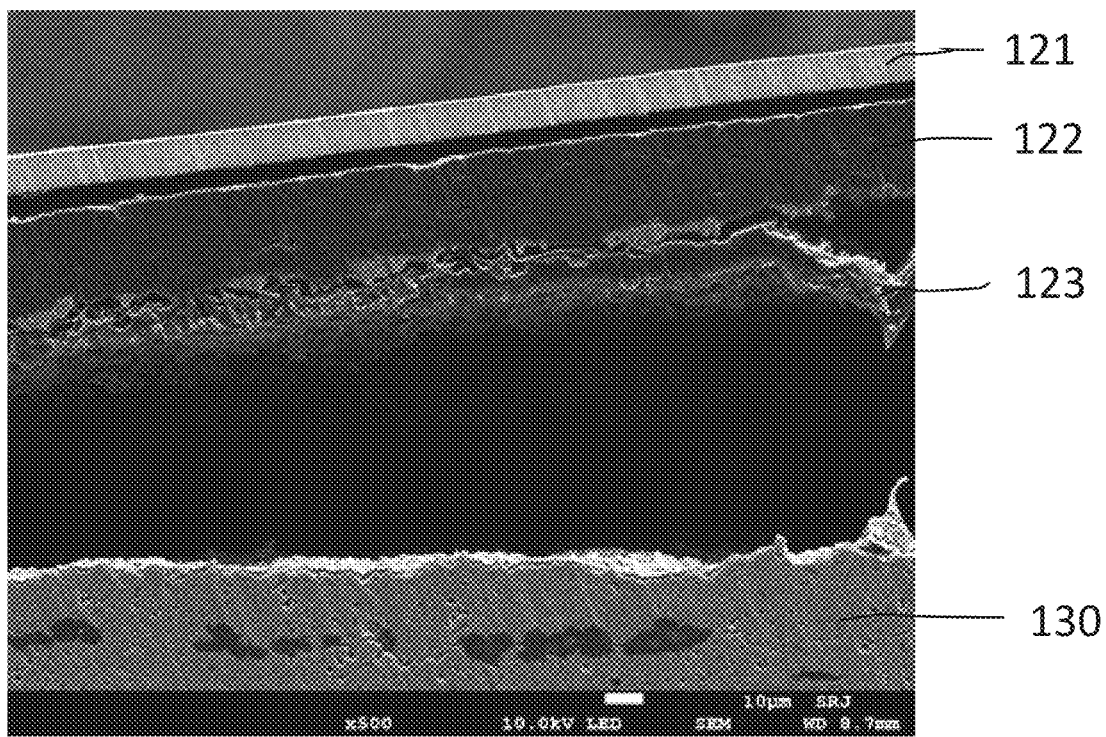
FIG. 5A is an SEM image of a cross-section of an all-solid-state secondary battery in which graphite was used as an anode active material.
Figure 5B:
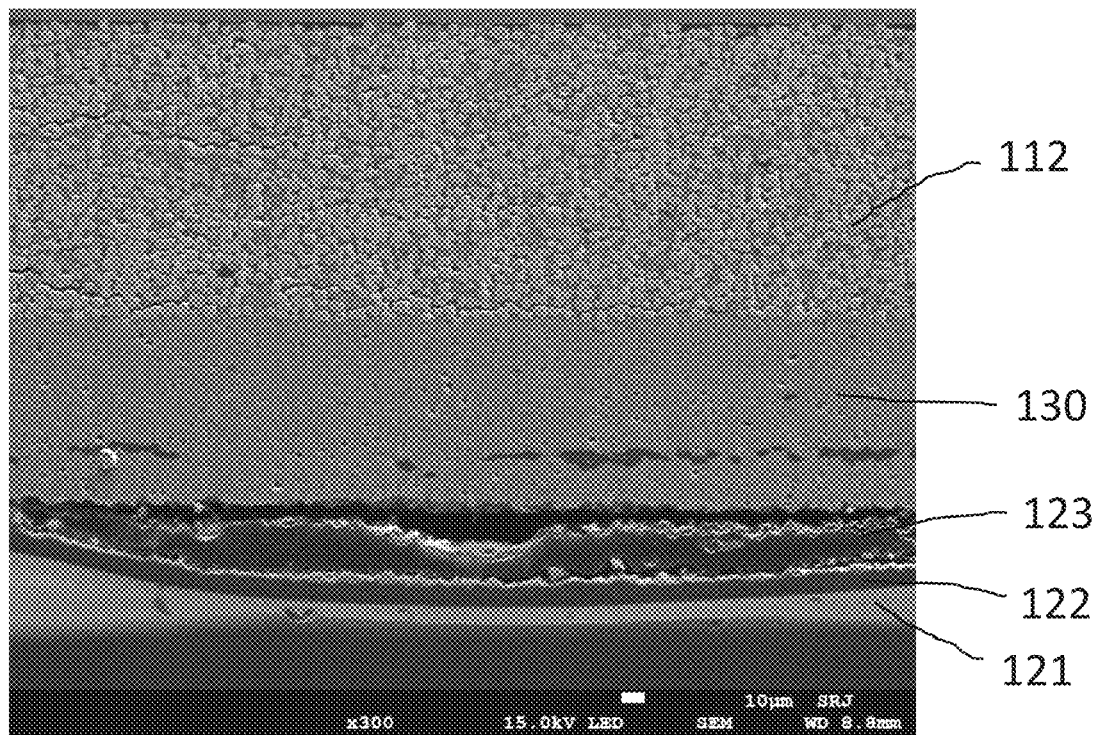
FIG. 5B is an SEM image of a cross-section of an all-solid-state secondary battery in which scaly graphite was used as an anode active material.

In the present examples, all-solid-state secondary batteries were manufactured in the same manner as in Comparative Examples 2A and 2B using the spherical graphite (Comparative Example 3A) or the scaly graphite (Comparative Example 3B) as an anode active material. Each battery was charged once under the same conditions as those in Example 2. Subsequently, the batteries were disassembled in a dry air atmosphere and the cross-sections of the all-solid-state secondary batteries were each polished using an ion milling device, and then observed using a SEM. As illustrated in FIG. 5, in both batteries it was observed that lithium was deposited by charging at an interface between a graphite layer and a solid electrolyte layer.

Example 9

In the present example, LiNi$_{0.8}$Co$_{0.15}$Al$_{0.05}$O$_2$ (NCA) was used as a cathode active material. The cathode was prepared in the same manner as Example 1. The initial charge capacity of the cathode layer was about 22 mAh using the half-cell as described above.

The anode included a lithium metal layer arranged between Ni foil as an anode current collector and a furnace black (FB-B) layer using FB-B having an average primary particle diameter D50 of about 38 nm as an anode active material. The FB-B particles are an amorphous carbon material.

An anode precursor was prepared as follows. First, an FB-B film was formed on Ni foil using the same method as that used in Example 1. An initial charge capacity of the anode precursor including the FB-B film was 2.4 mAh. The resulting b/a value of the battery is 0.109, which satisfies the condition of Equation 1. Next, the NCA cathode formed in the same manner as in Example 1, and the solid electrolyte layer was formed according to the method of Example 1.

The all-solid-state secondary battery was prepared as follows. The anode precursor including the Ni foil with the FB-B layer formed thereon were stacked on the solid electrolyte layer, having the shape of a square with a side length of 2.2 cm, such that the side having the FB-B layer contacted the solid electrolyte layer. The resulting structure was encapsulated in a laminating film in a vacuum state and subjected to hydraulic pressure treatment at 490 MPa for 30 minutes. After treatment, the laminating film was disassembled and the Ni foil was removed from the FB-B layer, wherein the FB-B film was effectively transferred onto the solid electrolyte layer. Next, Li foil in the shape of a square with a side length of 2 cm and having a thickness of 30 μm was pressed onto the Ni foil, the resulting structure was stacked on the above-described stacked structure including the FB-B film and the solid electrolyte layer such that the Li foil comes into contact with the FB-B film, thereby forming a stacked structure including the anode and the electrolyte layer.

The cathode was then stacked on the electrolyte layer to provide a stacked structure that included the cathode, solid electrolyte layer, and anode in this order, followed by encapsulation in a laminating film in a vacuum state, thereby completing the manufacture of an all-solid-state secondary battery. In this regard, a part of each of the cathode current collector and the anode current collector was allowed to protrude to the outside from the laminating film so as not to break the vacuum state of the battery. These protrusions were used as terminals for the cathode and the anode. In addition, the all-solid-state secondary battery was subjected to hydrostatic pressure treatment at 49 MPa for 5 minutes. After this treatment, the all-solid-state battery was sandwiched between two 1 cm thick stainless steel plates and kept pressed at 4 MPa using four screws during the charge/discharge test.

Next, the battery was evaluated by a charge/discharge test and the results thereof are shown in Table 3 below. At the $1^{st}$ cycle, the battery was charged at a constant current density of 0.5 mA/cm$^2$ until the voltage reached 4.2 V, and was charged at a constant voltage of 4.2 V until the current reached 0.2 mA. Thereafter, the battery was discharged at a constant current density of 0.5 mA/cm$^2$ until the voltage reached 2.0 V. After the $2^{nd}$ cycle, the battery was charged at a constant current density of 1.67 mA/cm$^2$ until the battery voltage reached 4.2 V, and charged at a constant voltage of 4.2 V until the current reached 0.2 mA/cm$^2$. The discharging process was performed at a current density of 2.5 mA/cm$^2$. The charge/discharge test was performed after the all-solid-state secondary battery was placed in a thermostatic bath at 60° C. As a result, the charging and discharging processes were stably performed up to $190^{th}$ cycle or more. An initial specific discharge capacity was 218 mAh/g and a capacity retention was 99.95% per cycle, as determined according to Equation 2.

TABLE 3

| | Anode Binder [wt %] | Initial Cathode Charge Capacity (a) [mAh] | Initial Anode Charge Capacity (b) [mAh] | b/a | Initial Discharge Specific Capacity [mAh/g] | Capacity Retention [%/cycle] | Total Cycles [n] |
|---|---|---|---|---|---|---|---|
| Example 7A | 3.0% | 22 | 3.6 | 0.164 | 168 | 99.7 | >100 |
| Example 7B | 1.0% | 22 | 1.2 | 0.055 | 163 | 99.5 | >40 |
| Example 8A | 3.0% | 22 | 0.3 | 0.014 | 154 | 99.5 | 25 |
| Example 8B | 3.0% | 22 | 1.2 | 0.055 | 170 | 99.5 | 21 |
| Example 8C | 3.0% | 22 | 2.4 | 0.109 | 169 | 99.4 | >100 |
| Example 8D | 3.0% | 22 | 3.6 | 0.164 | 168 | 99.7 | >100 |
| Example 9 | 3.0% | 22 | 2.4 | 0.109 | 218 | 99.95 | >100 |
| Comparative Example 2A | 3.0% | 22 | 2.0 | 0.091 | 165 | — | 1 |
| Comparative Example 2B | 3.0% | 22 | 1.0 | 0.045 | 162 | — | 1 |
| Comparative Example 4 | 0 | 22 | 0 | 0 | 206 | — | 1 |

Comparative Example 4

In the present example, the anode was prepared in the same manner as Example 9, except the process of transferring a FB-B layer to a solid electrolyte layer was omitted. The cathode formed according to Example 9 and the solid electrolyte layer formed according to Example 1 were stacked, and encapsulated in a laminating film in a vacuum state, followed by hydraulic pressure treatment at 490 MPa for 30 minutes. After treatment, the laminating film was disassembled and the stacked structure was taken out thereof. A Li foil in the shape of a square with a length of 2 cm and having a thickness of 30 μm was pressed onto Ni foil, the resulting structure was stacked on the above-described stacked structure such that the Li foil came into contact with the solid electrolyte layer, followed by encapsulation in a laminating film in a vacuum state, thereby completing the manufacture of an all-solid-state secondary battery. In this regard, a part of each of the cathode current collector and the anode current collector were allowed to protrude to the outside from the laminating film so as not to break the vacuum state of the battery. These protrusions were used as terminals for the cathode and the anode. In addition, the all-solid-state secondary battery was subjected to hydrostatic pressure treatment at 49 MPa for 5 minutes. After this treatment, the all-solid-state battery was sandwiched between two 1 cm thick stainless steel plates and kept pressed at 4 MPa using four screws during the charge/discharge test.

A charge/discharge test was performed on the all-solid-state secondary battery under the same conditions as those in Example 9. An initial specific discharge capacity was 206 mAh/g, and a short circuit occurred during the 2$^{nd}$ cycle of charging. The results are shown in Table 3 above.

Examples 10A to 10E

In the present example, NCM cathode was used as cathode active material, and silicon powder having an average particle diameter D50 of 100 nm (Example 10A), silver powder having an average particle diameter D50 of 3 μm (Example 10B), tin powder having an average particle diameter D50 of 150 nm (Example 10C), aluminum powder having an average particle diameter D50 of 3 μm (Example 10D), or bismuth powder having an average particle diameter D50 of 1.5 μm (Example 10E) were each used as anode active materials.

The anodes were prepared as follows. First, 4 g of each anode active material was put in a container, and 4 g of an NMP solution including 5 wt % of a binder (KF-polymer #9300 available from Kureha Inc.) was added thereto. Subsequently, the mixed solution was stirred while slowly adding NMP thereto to prepare an anode slurry. NMP was added until the viscosity of the anode slurry became a state suitable for film formation using a blade coater. The prepared anode slurry was coated onto Ni foil using a blade coater, and dried in air at 80° C. for 20 minutes. The resulting stacked structure was further dried in a vacuum state at 100° C. for 12 hours.

All-solid-state secondary batteries using each of the anodes were manufactured in the same manner as in Example 1. At the 1$^{st}$ cycle, each battery was charged at a constant current density of 0.5 mA/cm$^2$ until the battery voltage reached 4.2 V, and then was charged at a constant voltage of 4.2 V until the current reached 0.2 mA. Thereafter, each battery was discharged at a constant current density of 0.5 mA/cm$^2$ until the battery voltage reached 2.0 V. After the 2$^{nd}$ cycle, each battery was charged at a constant current density of 2.5 mA/cm$^2$ until the battery voltage reached 4.2 V, and then discharged at a constant current density of 2.5 mA/cm$^2$. A charge/discharge test was performed using the same method as that used in Example after each all-solid-state secondary battery was placed in a thermostatic bath at 60° C. The results thereof are shown in Table 4 below. In all of the batteries including the different anodes, an effect of inhibiting a short circuit during charging was confirmed. In addition, it was confirmed that a short circuit inhibitory effect was shown also in the case of the particle diameter of 3 μm (i.e., Examples 10B and 10D).

Comparative Examples 5A and 5B

In the present example, all-solid-state secondary batteries were manufactured in the same manner as in Example 1, except that nickel particles having average particle diameters D50 of 100 nm (Comparative Example 5A) or silicon carbide particles having particle diameters D50 of 50 nm (Comparative Example 5B) were used as anode active materials. These anode active materials do not provide anodes that have a measurable charge capacity, and thus the b/a value is 0, which does not satisfy the condition of Equation 1. Charge/discharge characteristics of each battery were evaluated using the same method as that used in Example 10. The results thereof are shown in Table 4 below, from which it was confirmed that a short circuit occurred during the 1$^{st}$ cycle of charging.

Comparative Examples 6A and 6B

Mixing of Element Alloyable with Li and Element not Alloyable with Li

In the present example, silicon particles having average particle diameters D50 of 100 nm, nickel particles having average particle diameters D50 of 100 nm, and silicon carbide particles having average particle diameters D50 of 50 nm were prepared. Anode active materials were prepared using a mixture of silicon and nickel particles in a weight ratio of 1:1 (Comparative Example 6A) or a mixture of silicon and silicon carbide particles in a weight ratio of 1:1 were prepared (Comparative Example 6B). All-solid-state secondary batteries were manufactured in the same manner as in Example 10, except that these anode active material mixtures were used as anode active materials. The b/a value of each all-solid-state secondary battery satisfied the condition of Equation 1.

Charge/discharge characteristics of each all-solid-state secondary battery was evaluated using the same method as that used in Example 10. The results thereof are shown in Table 4. In both cases, an effect of inhibiting a short circuit during charging was small.

TABLE 4

| | Anode Binder [wt %] | Particle Diameter (μm) | Initial Cathode Charge Capacity (a) [mAh] | Initial Anode Charge Capacity (b) [mAh] | b/a | Initial Discharge Specific Capacity [mAh/g] | Capacity Retention [%/cycle] | Total Cycles [n] |
|---|---|---|---|---|---|---|---|---|
| Example 10A | Si | 0.1 | 22 | 6 | 0.27 | 192 | 99.7 | 18 |
| Example 10B | Ag | 3 | 22 | 1.5 | 0.07 | 187 | 99.8 | >60 |
| Example 10C | Sn | 0.2 | 22 | 4.7 | 0.21 | 178 | 99.7 | >60 |
| Example 10D | Al | 3 | 22 | 3.0 | 0.14 | 157 | 99.7 | >60 |
| Example 10E | Bi | 1.5 | 22 | 3.0 | 0.136 | 171 | 99.7 | >60 |
| Comparative Example 5A | Ni | 0.1 | 22 | 0 | 0 | 160 | — | 0 |
| Comparative Example 5B | SiC | 0.05 | 22 | 0 | 0 | 156 | — | 0 |
| Comparative Example 6A | Si/Ni | — | 22 | 3.4 | 0.15 | 187 | 99.5 | 3 |
| Comparative Example 6B | Si/SiC | — | 22 | 3.9 | 0.18 | 187 | 99.5 | 4 |

Examples 11A and 11B

In the present examples, NCA cathode was used as cathode active material, furnace black (FB-C) particles having an average particle diameter D50 of about 76 nm and silver particles having an average particle diameter D50 of about 800 nm were prepared for the anode. Anode active materials prepared using the FB-C powder alone (Example 11A) or a mixture of FB-C and silver particles in a weight ratio of 3:1 (Example 11B) were used in the respective anodes. The FB-C particles are an amorphous carbon material.

The anodes were prepared as follows. First, 4 g of the anode active material was put in a container, and 4 g of an NMP solution including 5 wt % of a binder (KF-polymer #9300 available from Kureha Inc.) was added thereto. Subsequently, the mixed solution was stirred while slowly adding NMP thereto to prepare an anode slurry. NMP was added until the viscosity of the anode slurry became a state suitable for film formation using a blade coater. The prepared anode slurry was coated onto Ni foil using a blade coater, and dried in air at 80° C. for 20 minutes. The resulting stacked structure was further dried in a vacuum state at 100° C. for 12 hours. An anode was formed by the above-described process for each of the anode active materials.

An all-solid-state secondary battery was manufactured in the same manner as in Example 1 using each of these anodes. Each battery was evaluated by the following charge/discharge test. At the $1^{st}$ cycle, each battery was charged at a constant current density of 0.5 mA/cm$^2$ until the battery voltage reached an upper limit of 4.25 V, and was charged at a constant voltage of 4.25 V until the current reached 0.2 mA. Thereafter, each battery was discharged at a constant current density of 0.5 mA/cm$^2$ until the battery voltage reached 2.0 V. After the $2^{nd}$ cycle, each battery was charged at a constant current density of 2.5 mA/cm$^2$ until the battery voltage reached 4.25 V, and then discharged at a constant current density of 2.5 mA/cm$^2$. A charge/discharge test was performed using the same method as in Example 1 after each all-solid-state secondary battery was placed in a thermostatic bath at 60° C. The results thereof are shown in Table 5. In the case in which FB-C was used alone as the anode active material, charging and discharging were performed only up to the $13^{th}$ cycle. In the case of the anode active material including the mixture of FB-C and silver, charging and discharging were stably performed up to the $100^{th}$ cycle or more. In addition, an initial discharge capacity was increased, from which it can be seen that characteristics are enhanced using the anode active material mixture of FB-C powder and silver particles (FB-C/Ag).

Examples 11C to 11E

In the present examples, furnace black (FB-B) particles having an average particle diameter D50 of about 38 nm and silver particles having an average particle diameter D50 of about 20 nm, 60 nm, or 800 nm were prepared. Anode active materials prepared using the FB-B powder alone (Example 11F) or a mixture of FB-B and silver particles in a weight ratio of 3:1 (Examples 11C to 11E) were used in the respective anodes.

An all-solid-state secondary battery was manufactured in the same manner as in Example 1 using each of these anodes. A charge/discharge test was performed using the same method as in Example 11A after each all-solid-state secondary battery was placed in a thermostatic bath at 60° C. The results thereof are shown in Table 5. In the case in which FB-B was used alone as the anode active material, charging and discharging were performed only up to the second cycle. In the case of the anode active material including the mixture of FB-B and silver, charging and discharging were stably performed up to the $100^{th}$ cycle or more. In addition, an initial discharge capacity was increased, from which it can be seen that characteristics are enhanced using the anode active material mixture of FB-B powder and silver particles (FB-B/Ag). The capacity retention was better when the Ag particle size is less than 100 nm.

Examples 11F to 11L

In the present example, furnace black (FB-B) particles having an average particle diameter D50 of about 38 nm and silver particles having an average particle diameter D50 of about 60 nm were prepared. The anode active materials having different weight ratios of FB-B to silver particles, as specified in Table 5, were used for respective anodes.

An all-solid-state secondary battery was manufactured in the same manner as in Example 1 using each of these anodes. A charge/discharge test was performed using the same method as in Example 11A after each all-solid-state secondary battery was placed in a thermostatic bath at 60° C. The results thereof are shown in Table 5. By adding Ag particles from 5 wt % to 67 wt % based on the total weight of the anode active material, the capacity and the cycle retention were improved relative to Example 11F which contained no silver particles.

TABLE 5

|  | Anode Active Material | Particle Diameter (μm) | Initial Cathode Charge Capacity (a) [mAh] | Initial Anode Charge Capacity (b) [mAh] | b/a | Initial Discharge Specific Capacity [mAh/g] | Total Cycles [n] |
|---|---|---|---|---|---|---|---|
| Example 11A | FB-C | 0.076 | 22 | 2.1 | 0.095 | 201 | 13 |
| Example 11B | FB-C/Ag (3:1) | 0.8 (Ag) | 22 | 2.4 | 0.109 | 219 | >100 |
| Example 11C | FB-B/Ag (3:1) | 0.02 (Ag) | 26 | 2.4 | 0.092 | 213 | >100 |
| Example 11D | FB-B/Ag (3:1) | 0.06 (Ag) | 26 | 2.4 | 0.092 | 212 | >100 |
| Example 11E | FB-B/Ag (3:1) | 0.8 (Ag) | 26 | 2.4 | 0.092 | 210 | >100 |
| Example 11F | FB-B | 0.038 | 26 | 2.4 | 0.092 | 204 | 2 |
| Example 11G | FB-B/Ag (19:1) | 0.06 (Ag) | 26 | 2.4 | 0.092 | 211 | 17 |

TABLE 5-continued

|  | Anode Active Material | Particle Diameter (μm) | Initial Cathode Charge Capacity (a) [mAh] | Initial Anode Charge Capacity (b) [mAh] | b/a | Initial Discharge Specific Capacity [mAh/g] | Total Cycles [n] |
|---|---|---|---|---|---|---|---|
| Example 11H | FB-B/Ag (7:1) | 0.06 (Ag) | 26 | 2.4 | 0.092 | 223 | >100 |
| Example 11I | FB-B/Ag (3:1) | 0.06 (Ag) | 26 | 2.4 | 0.092 | 223 | >100 |
| Example 11J | FB-B/Ag (2:1) | 0.06 (Ag) | 26 | 2.4 | 0.092 | 218 | >100 |
| Example 11K | FB-B/Ag (1:1) | 0.06 (Ag) | 26 | 2.4 | 0.092 | 224 | >100 |
| Example 11L | FB-B/Ag (1:2) | 0.06 (Ag) | 26 | 2.4 | 0.092 | 211 | >100 |

Examples 12A to 12E

In the present example, FB-C powder (Example 12A) or powder mixtures prepared by mixing FB-C with 10 wt % (Example 12B), 25 wt % (Example 12C), 33 wt % (Example 12D), or 50 wt % (Example 12E) of silver particles having an average particle diameter D50 of about 800 nm were prepared as anode active materials. An anode was formed using the same method as that used in Example 11A by using each anode active material powder, followed by manufacture of an all-solid-state secondary battery using the same method as that used in Example 11A.

Figure 6:
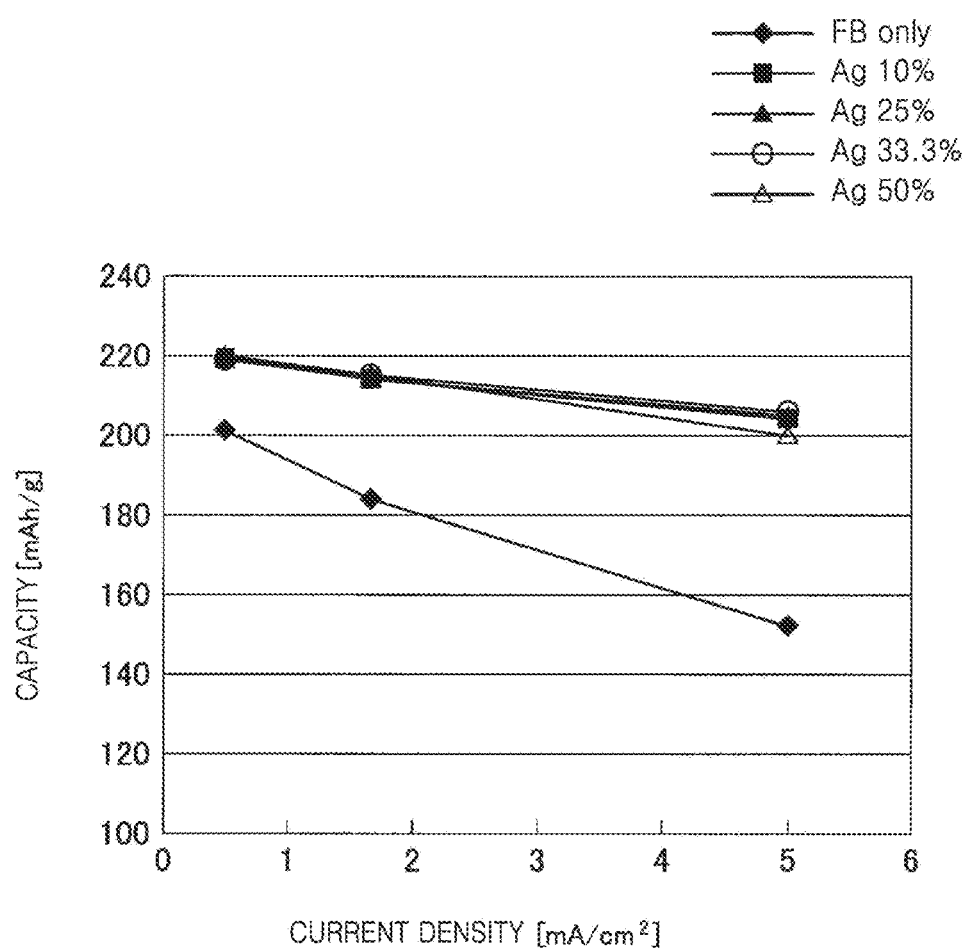
FIG. 6 is a graph of specific capacity (milliampere hours per gram, mAh/g) versus discharge current density (milliamperes per square centimeter, $mA/cm^2$) showing output characteristics when using an anode active material comprising furnace black and silver (Ag)

Output characteristics of these all-solid-state secondary batteries were evaluated by the following charge/discharge test. At the $1^{st}$ cycle, each battery was charged at a constant current density of 0.5 mA/cm$^2$ until the battery voltage reached an upper limit of 4.25 V, and was charged at a constant voltage of 4.25 V until the current reached 0.2 mA. Thereafter, each battery was discharged at a constant current density of 0.5 mA/cm$^2$ until the battery voltage reached 2.0 V. At the $2^{nd}$ cycle and the $3^{rd}$ cycle, charging was performed under the same conditions as those at the $1^{st}$ cycle, and then each battery was discharged at a constant current density of 1.67 mA/cm$^2$ ($2^{nd}$ cycle) or 5 mA/cm$^2$ ($3^{rd}$ cycle) until the voltage reached 2 V. A charge/discharge test was performed using the same method as used in Example 1 after each all-solid-state secondary battery was placed in a thermostatic bath at 60° C. The results thereof are shown as a graph in FIG. 6, from which it can be confirmed that capacity and discharge characteristics at a high current density may be enhanced using the anode active material including a mixture of FB-C and silver particles.

Examples 13A to 13E

Figure 7:
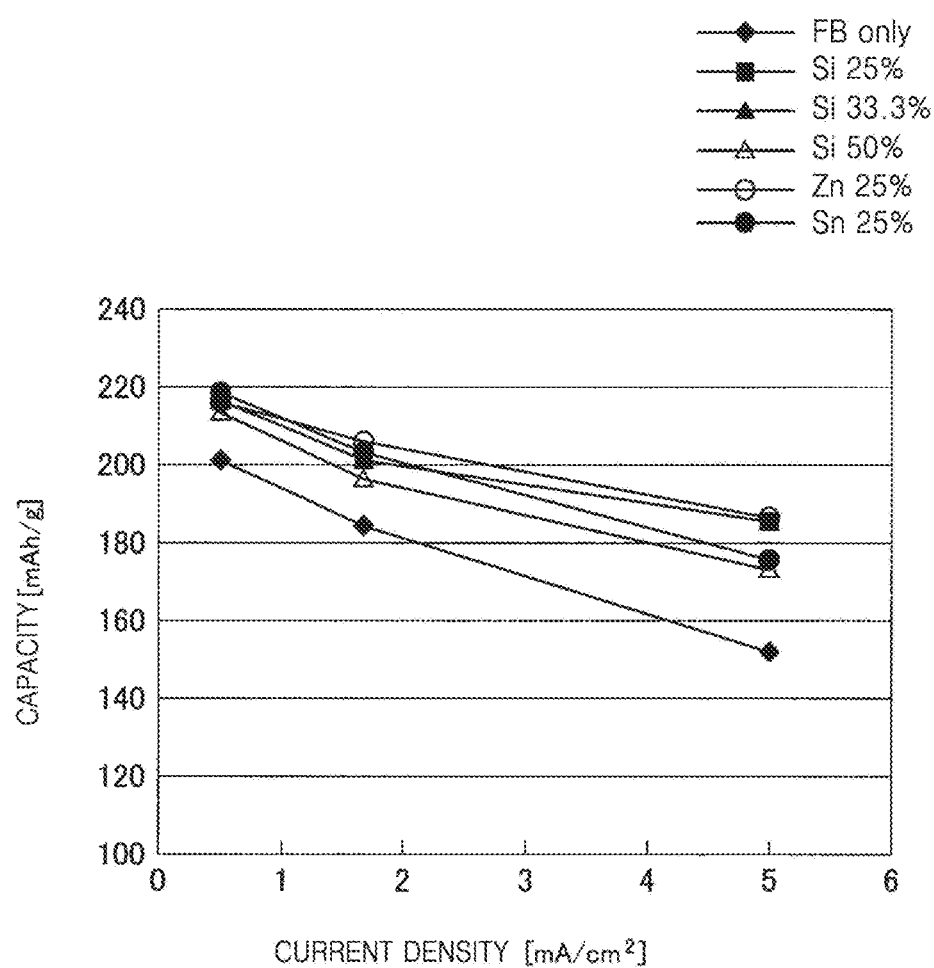
FIG. 7 is a graph of specific capacity (mAh/g) versus discharge current density ($mA/cm^2$) showing output characteristics when using an anode active material comprising furnace black anode and silicon (Si), tin (Sn), or zinc (Zn)

In the present example, powders prepared by mixing FB with 25 wt % (Example 13A), 33 wt % (Example 13B), or 50 wt % (Example 13C) of silicon particles having an average particle diameter D50 of about 100 nm, a powder mixture of FB-C and 25 wt % of Sn particles having an average particle diameter D50 of 150 nm (Example 13D), or a power mixture of FB-C and 25 wt % of Zn particles having an average particle diameter D50 of 100 nm (Example 13E) were prepared as anode active materials. An anode was formed using the same method as that used in Example 11 using each anode active material powder, an all-solid-state secondary battery was manufactured using the same method as that used in Example 11A, and output characteristics thereof were evaluated using the same method as that used in Example 12A. The results thereof are shown as a graph in FIG. 7, from which it can be seen that capacity and discharge characteristics at a high current density may be enhanced using an anode active material mixture of FB-C and Si particles, Zn particles, or Sn particles.

Figure 8:
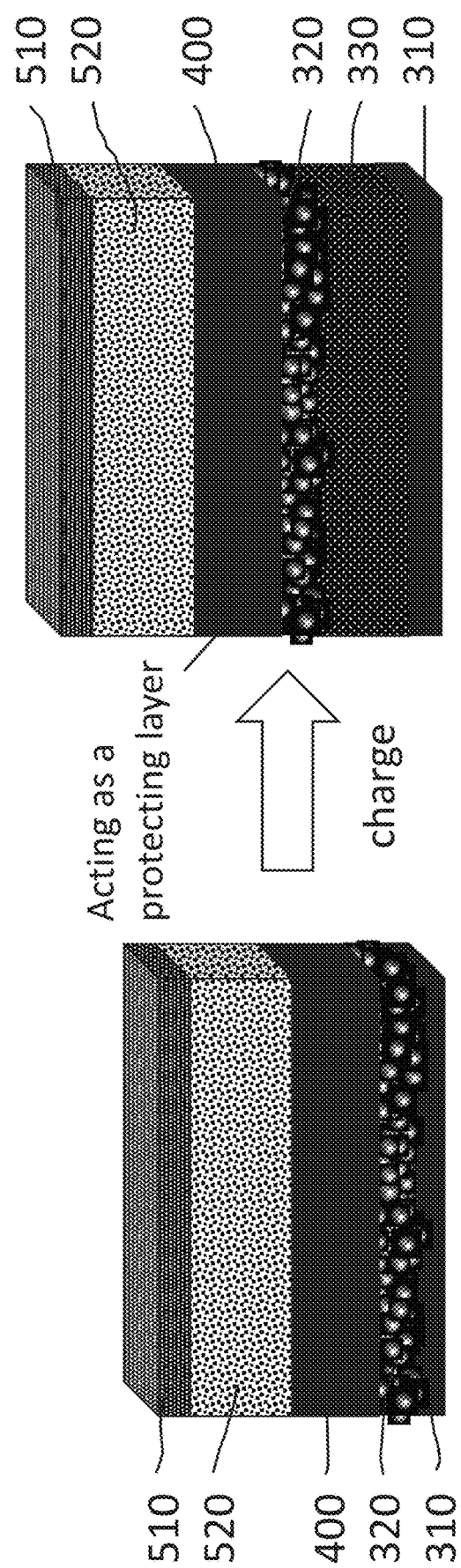
FIG. 8 illustrates an embodiment of a method of charging an all-solid-state secondary battery.

FIG. 8 illustrates perspective views for explaining an all-solid-state secondary battery according to an embodiment and a method of charging the same according to another embodiment.

Referring to FIG. 8, the all-solid-state secondary battery may include an anode current collector 310, an anode active material layer 320, a solid electrolyte layer 400, a cathode active material layer 520, and a cathode current collector 510. In this regard, the anode active material layer 320 may include a carbon black material. At the initial stage or after discharging, lithium may be not present or substantially not present between the anode current collector 310 and the anode active material layer 320. During charging, lithium is deposited between the anode current collector 310 and the anode active material layer 320 and a metal layer 330 may be formed by such lithium. In this case, the anode active material layer 320 may act as a protective layer. A ratio of initial charge capacity (b) of the anode active material layer 320 to initial charge capacity (a) of the cathode active material layer 520 may satisfy the following condition: 0.01<(b/a)<0.5. In addition, the anode active material layer 320 may further include particles of a metal or a semiconductor in a carbon black material layer. In this regard, the metal or the semiconductor may be, for example, gold (Au), platinum (Pt), palladium (Pd), silicon (Si), silver (Ag), aluminum (Al), bismuth (Bi), tin (Sn), zinc (Zn), or a combination thereof. Through this, the characteristics of an anode may be further enhanced. Instead of using the carbon black, for example, furnace black (FB), acetylene black (AB), Ketjen black (KB), graphene, a combination thereof, or the like may be used. In an embodiment, before charging, a metal layer may be previously formed between the anode current collector 310 and the anode active material layer 320.

Figure 9:
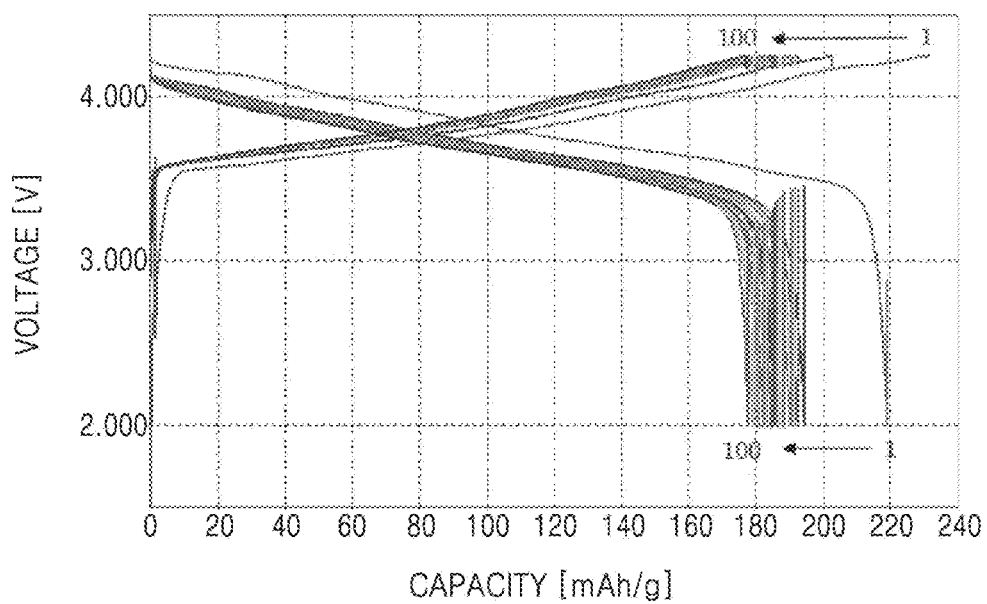
FIG. 9 is a graph of voltage (V) versus specific capacity (mAh/g) showing charge/discharge characteristics of an embodiment of all-solid-state secondary battery.

FIG. 9 is a graph showing charge/discharge characteristics of an exemplary all-solid-state secondary battery according to an embodiment.

Referring to FIG. 9, charge/discharge characteristics of an all-solid-state secondary battery (lithium battery) were evaluated. Characteristics evaluation was performed after the all-solid-state secondary battery was placed in a thermostatic bath at 60° C. At the $1^{st}$ cycle, the battery was charged at a constant current density of 0.5 mA/cm$^2$ until the battery voltage reached 4.25 V, and was charged at a constant voltage of 4.25 V until the charge current reached 0.2 mA. Thereafter, the battery was discharged at a constant current density of 0.5 mA/cm² until the battery voltage reached 2.0 V. After the 2nd cycle, the battery was subjected to constant-current charging and constant-current discharging at a current density of 1.67 mA/cm² and 2.5 mA/cm², respectively. As illustrated in charge/discharge curves of FIG. 9, stable charging and discharging were possible up to the 100th cycle or more, an initial discharge capacity was 219 mAh/g of active material, and an average capacity retention was about 99.9% per cycle.

Examples 14A to 14C

In the present example, powders prepared using KB-B and platinum particles were used as anode active materials. The platinum was present in amounts of 0 wt %, 20 wt %, or 50 wt % based on the total weight of the anode active material in Examples 14A, 14B, and 14C, respectively. The anodes layers were prepared as follows. First, 1 g of the anode mixture (powder) active material was put in a container, and 4 g of an NMP solution including 5 wt % of a binder (#9300KF-polymer #9300 available from Kureha Inc.) was added thereto. Subsequently, the mixture was stirred while slowly adding NMP thereto to prepare an anode slurry. NMP was added until the viscosity of the anode slurry became a state suitable for film formation using a blade coater. The prepared anode slurry was coated onto Ni foil using a blade coater, and dried in air at 80° C. for 20 minutes. The resulting stacked structure was further dried in a vacuum state at 100° C. for 12 hours. An anode layer was formed by the above-described process for each of the anode active materials. The all-solid batteries using these anodes are fabricated in the same way as Example 11A. The discharge properties were evaluated in the same way as Example 12A.

Figure 10:
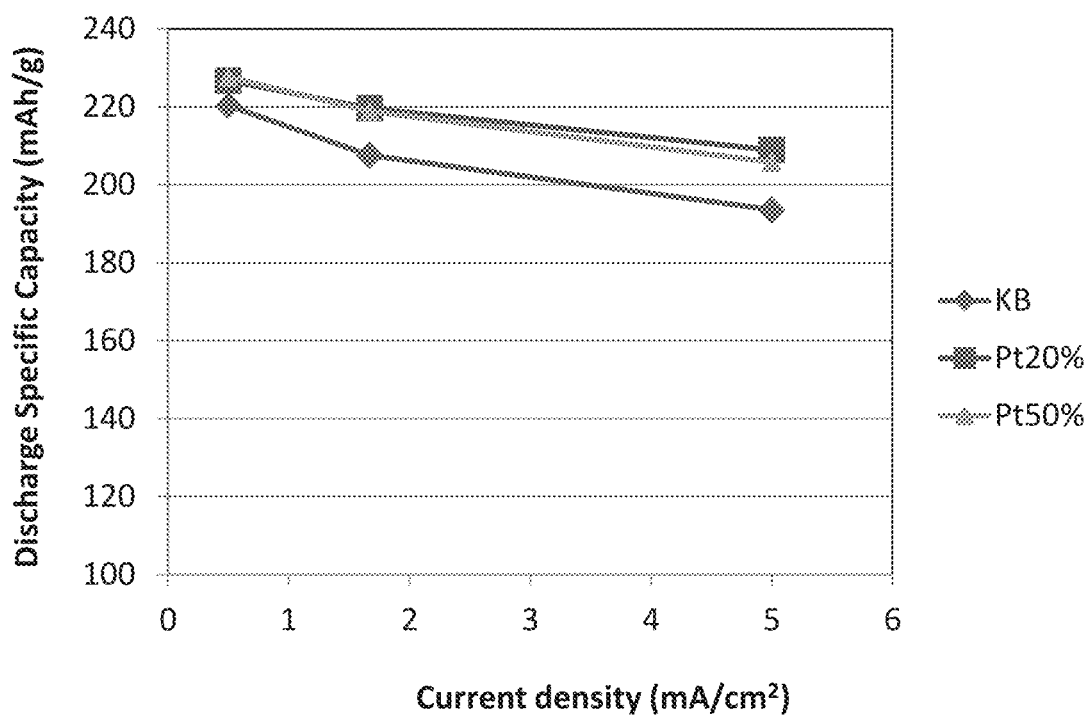
FIG. 10 is a graph of discharge specific capacity (mAh/g) versus current density ($mA/cm^2$) showing output characteristics when using an anode active material comprising Ketjen black and platinum (Pt).

FIG. 10 is a graph showing the change is discharge specific capacity based on current density for Examples 14A ("KB"), 14B ("Pt20%"), and 14C ("Pt50%"). These results demonstrate that the discharge properties are improved by the addition of Pt particles to the anode active material.

Although particular embodiments have been described in the foregoing description, these are exemplary embodiments and are not intended to limit the scope of the present disclosure, but are construed as being provided for illustrative purposes. For example, it will be understood by those of ordinary skill in the art that the all-solid-state secondary battery and the method of charging the same that have been described with reference to FIGS. 1 to 10 may be in various different forms. Thus, the scope of the present disclosure is not limited by the above-described embodiments, but should be defined by the technical scope and spirit of the following claims.

What is claimed is:

1. An all-solid-state secondary battery comprising:
a cathode comprising a cathode active material layer;
an anode comprising
an anode current collector, and
an anode active material layer on the anode current collector, wherein the anode active material layer comprises an anode active material comprising
a first particle comprising amorphous carbon, and
a second particle comprising at least one of a metal or a semiconductor, wherein an amount of the second particle is about 8 weight percent to about 60 weight percent, based on a total weight of the first particle and the second particle, and
a binder;
a solid electrolyte layer between the cathode and the anode; and
a metal layer between the anode active material layer and anode current collector, wherein the metal layer comprises at least one of lithium or a lithium alloy.

2. The all-solid-state secondary battery of claim 1, wherein a ratio of an initial charge capacity of the anode active material layer to an initial charge capacity of the cathode active material layer satisfies Equation 1:

$$0.01 < (b/a) < 0.5 \qquad \text{Equation 1}$$

wherein a is the initial charge capacity of the cathode active material layer, determined from a first open circuit voltage to a maximum charging voltage vs. Li/Li⁺, and
wherein b is the initial charge capacity of the anode active material layer, determined from a second open circuit voltage to 0.01 Volts vs. Li/Li⁺.

3. The all-solid-state secondary battery of claim 1, wherein the anode active material has an average particle diameter of about 4 micrometers or less.

4. The all-solid-state secondary battery of claim 1, wherein the amorphous carbon comprises at least one of furnace black, acetylene black, Ketjen black, or graphene.

5. The all-solid-state secondary battery of claim 1, wherein the amorphous carbon has an average particle diameter D50 of about 4 micrometers or less.

6. The all-solid-state secondary battery of claim 1, wherein the second particle comprises at least one of gold, platinum, palladium, silicon, silver, aluminum, bismuth, tin, or zinc.

7. The all-solid-state secondary battery of claim 6, wherein the second particle comprises at least one of silver, tin, or zinc.

8. The all-solid-state secondary battery of claim 1, wherein a weight ratio of the amorphous carbon to the second particle is about 20:1 to about 1:2.

9. The all-solid-state secondary battery of claim 1, wherein the binder comprises at least one of styrene butadiene rubber, polytetrafluoroethylene, polyvinylidene fluoride, or polyethylene.

10. The all-solid-state secondary battery of claim 9, wherein an amount of the binder ranges from about 0.3 weight percent to about 15 weight percent, based on a total weight of the anode active material.

11. The all-solid-state secondary battery of claim 1, wherein the anode active material layer has a thickness of about 1 micrometer to about 20 micrometers.

12. The all-solid-state secondary battery of claim 1, wherein the metal layer has a thickness of about 1 micrometer to about 200 micrometers.

13. The all-solid-state secondary battery of claim 2, wherein the ratio of the initial charge capacity of the anode active material layer to the initial charge capacity of the cathode active material layer satisfies a condition of Equation 1A:

$$0.01 < (b/a) < 0.25. \qquad \text{Equation 1A}$$

14. The all-solid-state secondary battery of claim 1, wherein the anode current collector, the anode active material layer, and a region therebetween are Li-free regions at an initial state of or after discharge of the all-solid-state secondary battery.

15. The all-solid-state secondary battery of claim 1, wherein the cathode active material layer further comprises a solid electrolyte.

16. The all-solid-state secondary battery of claim 15, wherein an amount of the solid electrolyte ranges from about 1 weight percent to about 50 weight percent, based on a total weight of the cathode active material layer.

17. The all-solid-state secondary battery of claim 1, wherein the all-solid-state secondary battery is a lithium battery.

18. The all-solid-state secondary battery of claim 1, wherein the maximum charging voltage is about 3 volts to about 5 volts versus $Li/Li^+$.

19. The all-solid-state secondary battery of claim 1, wherein the anode current collector comprises a material that does not form a compound with lithium.

20. The all-solid-state secondary battery of claim 19, wherein the anode current collector comprises at least one of titanium, copper, iron, cobalt, or nickel.

\* \* \* \* \*